(12) United States Patent
Briand et al.

(10) Patent No.: US 9,632,688 B2
(45) Date of Patent: Apr. 25, 2017

(54) ENHANCED USER INTERFACE TO TRANSFER MEDIA CONTENT

(75) Inventors: Hyacinthe Briand, San Francisco, CA (US); Bosco So, San Francisco, CA (US); Asha Vellaikal, San Francisco, CA (US); Gabriel Sidhom, Mill Valley, CA (US); Georges Nahon, San Francisco, CA (US)

(73) Assignee: FRANCE TELECOM, Paris (FR)

( * ) Notice: Subject to any disclaimer, the term of this patent is extended or adjusted under 35 U.S.C. 154(b) by 739 days.

(21) Appl. No.: 13/434,384

(22) Filed: Mar. 29, 2012

(65) Prior Publication Data
US 2012/0254793 A1   Oct. 4, 2012

Related U.S. Application Data

(60) Provisional application No. 61/470,356, filed on Mar. 31, 2011, provisional application No. 61/614,876, filed on Mar. 23, 2012.

(51) Int. Cl.
*G06F 3/048* (2013.01)
*G06F 3/0488* (2013.01)
(Continued)

(52) U.S. Cl.
CPC ............ *G06F 3/0488* (2013.01); *G06F 3/048* (2013.01); *H04N 21/4122* (2013.01);
(Continued)

(58) Field of Classification Search
USPC .................................................. 715/769, 800
See application file for complete search history.

(56) References Cited

U.S. PATENT DOCUMENTS 5,883,621 A * 3/1999 Iwamura ........................ 725/37
6,271,805 B1 * 8/2001 Yonezawa ..................... 345/1.1
(Continued)

FOREIGN PATENT DOCUMENTS

AU   2011/101160   * 10/2011
JP   2003323387 A  * 11/2003  ............. G06F 13/00

OTHER PUBLICATIONS

Janko Jovanovic, "Use jQuery to "turn off the lights" while watching videos", May 17, 2009, Blog link: http://www.jankoatwarpspeed.com/use-jquery-to-turn-off-the-lights-while-watching-videos/.*

(Continued)

*Primary Examiner* — Doon Chow
*Assistant Examiner* — Wendy Nicholas
(74) *Attorney, Agent, or Firm* — David D. Brush; Westman, Champlin & Koehler, P.A.

(57) ABSTRACT

A method and apparatus are provided for sharing a media content displayed in a window of the touch input interface of a first electronic device with at least one second electronic device. The first electronic device includes a processor controlling the touch input interface. The method is carried out by the processor and includes the acts of enabling displacement of the window in response to capturing a first touch input indicative of an initiation of a transfer, capturing a continuous touch input across the interface from an initial position in the window, displacing the window with each additional touch input of the continuous touch input, sending an activation message that the media content is to be played on the second device when determining that the window is within a given distance of a virtual representation of the second electronic device on the interface.

9 Claims, 21 Drawing Sheets

(51) Int. Cl.
*H04N 21/41* (2011.01)
*H04N 21/414* (2011.01)
*H04N 21/422* (2011.01)
*H04N 21/436* (2011.01)
*H04N 21/4402* (2011.01)
*H04N 21/443* (2011.01)
*H04N 21/4788* (2011.01)
*H04N 21/485* (2011.01)

(52) U.S. Cl.
CPC . *H04N 21/41407* (2013.01); *H04N 21/42224* (2013.01); *H04N 21/43615* (2013.01); *H04N 21/4438* (2013.01); *H04N 21/440263* (2013.01); *H04N 21/4788* (2013.01); *H04N 21/485* (2013.01)

(56) References Cited

U.S. PATENT DOCUMENTS

| | | | |
|---|---|---|---|
| 7,376,696 B2 * | 5/2008 | Bell et al. | 709/203 |
| 2006/0107303 A1 * | 5/2006 | Erhart et al. | 725/135 |
| 2006/0277469 A1 * | 12/2006 | Chaudhri et al. | 715/709 |
| 2010/0070899 A1 * | 3/2010 | Hunt | G06F 17/30861 715/769 |
| 2010/0115430 A1 * | 5/2010 | Skirpa | G06F 17/2247 715/760 |
| 2010/0122194 A1 | 5/2010 | Rogers | |
| 2010/0275163 A1 * | 10/2010 | Gillespie et al. | 715/810 |

OTHER PUBLICATIONS

Challenges Magazine, Dec. 9, 2010, No. 236, p. 118, www.challenges.fr.

* cited by examiner

ENHANCED USER INTERFACE TO TRANSFER MEDIA CONTENT

CROSS-REFERENCE TO RELATED APPLICATIONS

The present application is based on and claims the benefit of U.S. Provisional Patent Application No. 61/470,356, filed Mar. 31, 2011, and U.S. Provisional Patent Application No. 61/614,876, filed Mar. 23, 2012, the contents of which are hereby incorporated by reference in their entireties.

FIELD OF THE PRESENT SYSTEM

The present invention generally relates to mobile devices or handsets, and more specifically to mobile devices handling touch based inputs.

BACKGROUND OF THE PRESENT SYSTEM

Mobile handsets have an inherently impoverished graphical user interface (GUI) with respect to desktop computers. Small screens and tiny keyboards are typical of mobile handsets that fit in your pocket. Recent so called smart phones have introduced the use of a touch screen in an attempt to simplify the user experience with his mobile handset. For instance, the touch interface of the iPhone® has revolutionized the mobile handset industry and brought whole new mobile user experiences.

In existing smart phones, application programs (AP) may be controlled using touch inputs. Different touch inputs may control the AP in different ways. For instance, a user touching an AP icon will cause a control of the desktop GUI that will launch the AP corresponding to the touched icon. The desktop GUI of the iPhone™ comprising a plurality of AP icons may be seen as an AP itself. A sliding motion across the desktop GUI, or a drag touch input, will cause another control of the desktop GUI, like displaying another set of AP icons hidden so far. The user gets a feeling that he is browsing through pages of AP icons to select an interesting application program.

The new smartphones or even pads, like the Apple™ or Samsung™ tablets, are now capable of functions far beyond simple phone services. They can include media playing and recording, web browsing, games, etc.

Among media applications, it is possible now to playing media like videos or music with these devices. The media content can be local or streamed over a data connection from a media server.

Smart phones are just one of many devices available today to a user. Other devices like music players, TVs, computers, pads . . . can also play media content. Indeed, the emergence of connected devices has extended the realm of the possible when it comes for the user to interact with and share a media content. This creates the opportunity for a variety of players (manufacturers, pay-TV operators, Internet companies, telecom operators . . . ) to offer multi-screens solutions between devices.

Sharing solutions are now readily available to distribute the media content among the different user devices. A user for instance can send a picture from one smartphone to another target smartphone provided they both host the same sharing application. To do so the devices are paired and the user has the feeling that he is actually displacing the picture from one device to the other by simply sliding the picture with his finger in the direction of the receiving device.

Other solutions are available for videos played for instance on a tablet. Apple Airplay® is a solution proposed for local media content. A user may start viewing with a device like a smartphone or tablet a media content local to that device. He can then activate a popup menu listing different alternative target display devices, paired beforehand. Upon selection of one of them, the local content will be streamed through a home network from the viewing device to the selected target device.

Google Fling® offers a similar user's experience. Another solution is proposed by Snapstick™. It consists in browsing a catalog of different videos, and upon selection of one of them (an activation of a transfer), you can shake your device and the selected video is streamed directly to another predefined device.

The existing solutions, when they allow a pre-visualization of the media content, do not offer a fluid or intuitive experience for the user. They often present cluttered interfaces to the user, especially when he is offered the possibility of sharing with many user devices. Furthermore they do not rely extensively upon a rich environment like a touch interface. There is a need today for a new solution to share media content that really takes advantage of such a rich environment. There is a further need for an simplified interface that allows a simple and easy transfer to the user, besides the number of possible target devices.

SUMMARY OF THE PRESENT SYSTEM

It is an object of the present system to overcome disadvantages and/or make improvements in the prior art.

The present system relates to a method for sharing a media content displayed in a window of a first graphical user interface (GUI) of a first electronic device with at least one end point, said first electronic device comprising a processor controlling said first GUI, the method being carried out by said processor and comprising:
  capturing a user input within the window,
  generating a free space between the countours of the GUI and the window,
  displaying a virtual representation of the end point in the free space.

Thanks to the present method, the user has the impression that the selected content is isolated from its initial surroundings, giving room for any displacement, e.g. towards a virtual representation of a potential target for the content.

The present system also relates to an electronic device for sharing a media content displayed in a window of a first graphical user interface (GUI) of said electronic device with at least one end point, said electronic device comprising a processor controlling said graphical input interface, said processor being arranged to:
  capturing a user input within the window,
  generating a free space between the countours of the GUI and the window,
  displaying a virtual representation of the end point in the free space.

The present system also relates to an application embodied on a computer readable medium and arranged to share a media content displayed in a window of a first graphical user interface of an electronic device with at least one end point, the application being carried out by a processor of the electronic device and controlling the graphical user interface, the application comprising instructions for:
  capturing a user input within the window,
  generating a free space between the countours of the GUI and the window, displaying a virtual representation of the end point in the free space.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

Figure 1:
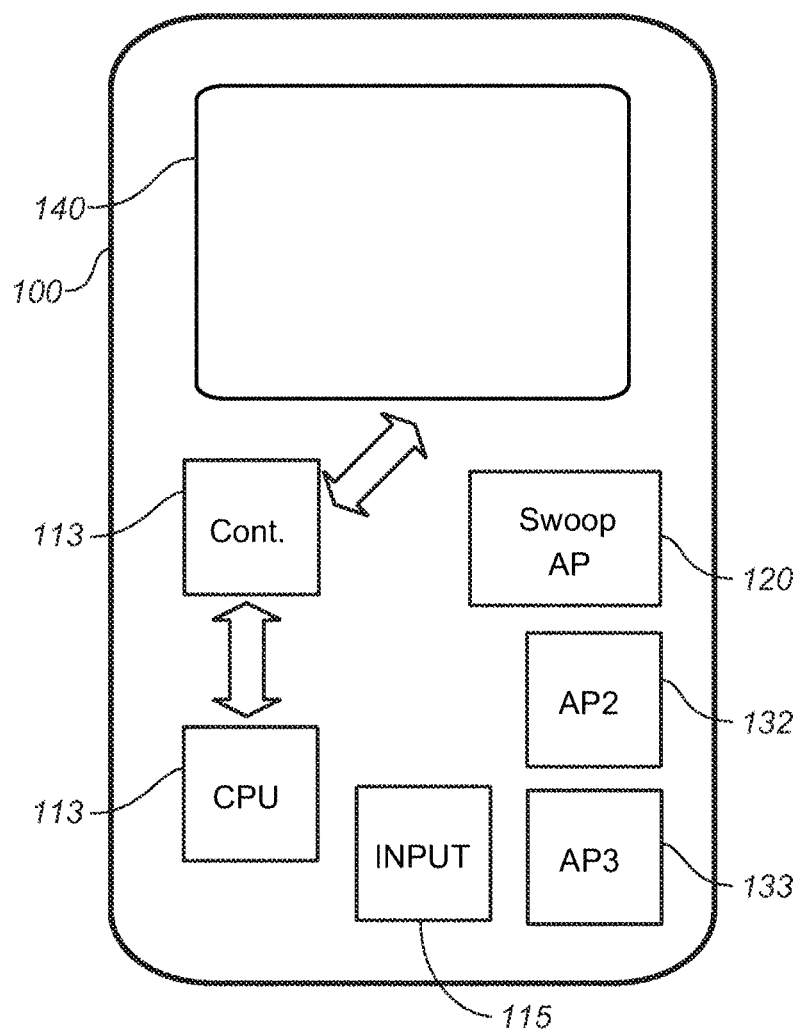
FIG. 1 shows a mobile device in accordance with an embodiment of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. An operative coupling may also include a wired and/or wireless coupling to enable communication between a media content platform, such as the media content serving a user device in accordance with an embodiment of the present system, and one or more user devices. An operative coupling may also relate to an interaction between program portions and thereby may not describe a physical connection so much as an interaction based coupling.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface on a display device so that it may be seen and interacted with by a user. The term rendering may also comprise all the actions required to generate a GUI prior to the display, like e.g. a map representation generated on a server side for a browser application on a user device.

The system, device(s), method, user interface, etc., described herein address problems in prior art systems. The man skilled in the art may easily apply the present teachings to any electronic device presenting a touch sensitive panel, (referred also hereafter as a touch sensitive display or screen), a pointing device (like a mouse) or a keyboard.

In accordance with an embodiment of the present system, an electronic device provides a GUI for controlling an application program (AP) through user inputs, such e.g. as touch or mouse inputs. In the description hereafter, reference will be made to a mobile device or handsets.

A graphical user interface (GUI) may be provided in accordance with an embodiment of the present system:
  by an application program running locally on a device processor, such as part of a computer system of a mobile device, and/or,
  as provided by a network connected device or web based server, such as a media content server providing media content to the user device, the GUI being rendered on user device through a local application program connected to media content server.

For instance, the present GUI enabling a swoop transfer (as explained later on) of displayed media content may be generated locally by a swoop application or rendered by a local AP connected to a swoop server providing the GUI elements. The provided visual environment may be displayed by the processor on a display device of the user device, e.g. a touch sensitive panel (touch panel in short), which a user may use to provide a number of touch inputs of different types.

A GUI is a type of user interface which allows a user to interact with electronic devices such as computers, hand-held devices such as smartphones of tablets, household appliances, office equipment and the likes. GUIs are typically used to render visual and textual images which describe various visual metaphors of an operating system, an application, etc., and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars, maps, etc. Such images can be arranged in predefined layouts, or can be created dynamically (by the device itself or by a web-based server) to serve the specific actions being taken by a user. In general, the user can select and/or activate various graphical images in order to initiate functions and tasks, i.e. controls, associated therewith. By way of example, a user can select a button that opens, closes, minimizes, or maximizes a window, a virtual representation or an icon that launches a particular application program. By way of another example, the GUI may present a typical user interface including a windowing environment and as such, may include menu items, pull-down menu items, icons, pop-up windows, etc., that are typical of those provided in a windowing environment, such as may be represented within a Windows™ Operating System GUI as provided by Microsoft Corporation and/or an OS™ Operating System GUI, such as provided on an iPhone™, MacBook™, iMac™, etc., as provided by Apple, Inc., and/or another operating system (OS).

In the description here after, an application program (AP)—or software—may be seen as any tool that functions and is operated by means of a computer, with the purpose of performing one or more functions or tasks for a user or another application program. To interact with and control an AP, a GUI of the AP may be displayed on the user device display.

FIG. 1 is an illustration of an exemplary user device 100 used in the present system. In the here after description, the user or electronic device will illustrated as a mobile device 100 with a touch interface. This illustration is in no way limiting as the present teaching would work for any user devices such as laptops, pads, desktops and the likes, enabling the user to interact through a touch interface, a pointing device and/or a keyboard. The mobile device 100 comprises a display device 140, a processor 110, a controller 113 of the display device, and an input device 115.

In the present system, the user interaction with and manipulation of the application program rendered on a GUI is achieved using the display device 140, or screen, which is presently a touch panel operationally coupled to the processor 112 controlling the displayed interface.

Processor 110 may control the rendering and/or the display of the GUI on the display device 140 depending on the type of application program, i.e. resident or web-based. Processor 110 may also handle the user entries according to the present method. The user entries to interact with an application program may be provided through interactions with the touch panel 140.

The touch panel 140 can be seen as an input device allowing interactions with a finger of a user or other devices such as a stylus. Touch sensor interface or touch panel 140 may include any suitable circuitry to convert analog signals corresponding to touch input received over its surface into any suitable digital touch input data. Such touch input data can, for example, be used to make selections of portions of the GUI of an AP or displace windows as explained here after. The input received from a user's touch is sent to the processor 110. The touch panel 140 is configured to detect and report the (location of the) touches to the processor 110, which can interpret the touches in accordance with the application program and the currently displayed GUI. For example, the processor 110 can initiate a task, e.g. a control of the AP or sent an activation message that the media content currently displayed is to be played on a second display device, subsequent to a given touch input.

The controller 113, e.g. a dedicated processor, may be provided to process input touches locally and reduce demand for the main processor 110 of the mobile device. The touch panel 140 can be based on sensing technologies including but not limited to capacitive sensing, resistive sensing, surface acoustic wave sensing, pressure sensing, optical sensing, and/or the likes. Here after, for simplification purpose, reference will be made to a finger of the user touching panel 140, other devices such as a stylus may be used in place of the user finger.

In the present system, a number of different applications may be provided with the mobile device 100, like AP2 132 and AP3 133. A swoop application 120 may be further provided to enable the present method.

The term swoop will be used here after to refer to the act and process of using an intuitive gesture on a first electronic device (e.g. mobile device, tablet . . . ) to send an asset or media content being experienced (e.g. video, photo, music . . . ) to an end point like a second electronic device (e.g. Roku player, connected TV, other tablet, laptop computer . . . ). The intuitive gesture will be described as a continuous touch input (i.e. a drag touch input) to transfer the displayed or experienced asset to another device (e.g. through a drop). Thanks to the present method, the user can enjoy a fluid transfer by sliding or dragging the media content from a first electronic device (the swooper or swooping device) to a recipient device, here after referred to as a swoopee (or swooped device). The transfer of the present system will be referred to as a swoop based transfer.

Figure 2A:
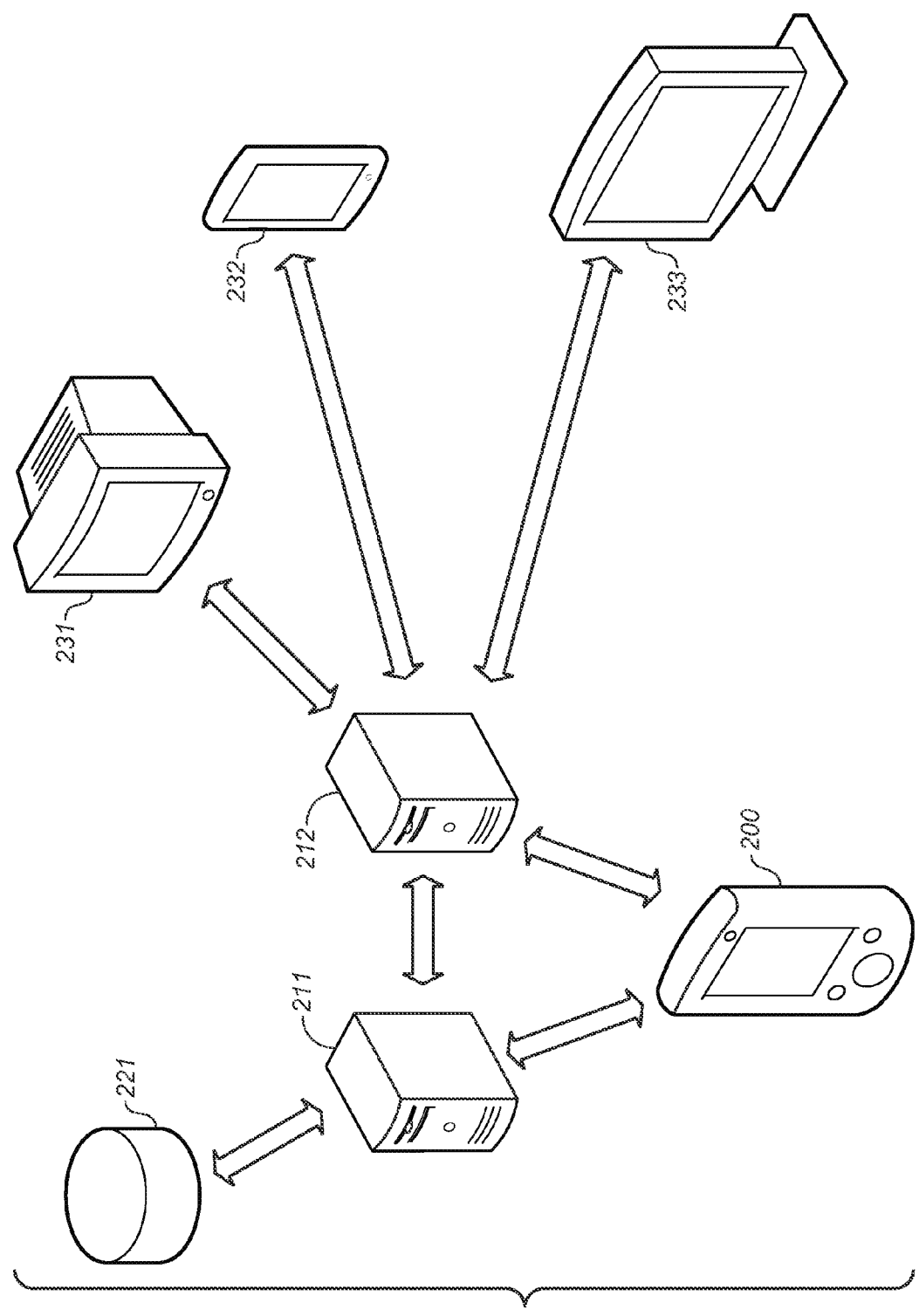
FIG. 2A shows an illustration of a first embodiment of the present system.

FIG. 2A is an illustration of a first embodiment of the present system with different operatively coupled devices. A mobile device 200 is configured for swooping a media content currently rendered or experienced on its touch interface. The content or asset may be browsed from a media content server 211 that distributes media content from one or more media content libraries or database 221. The browsing may be enabled in a web browser or through a web application like the swoop application 120 mentioned here before.

Figure 4A:
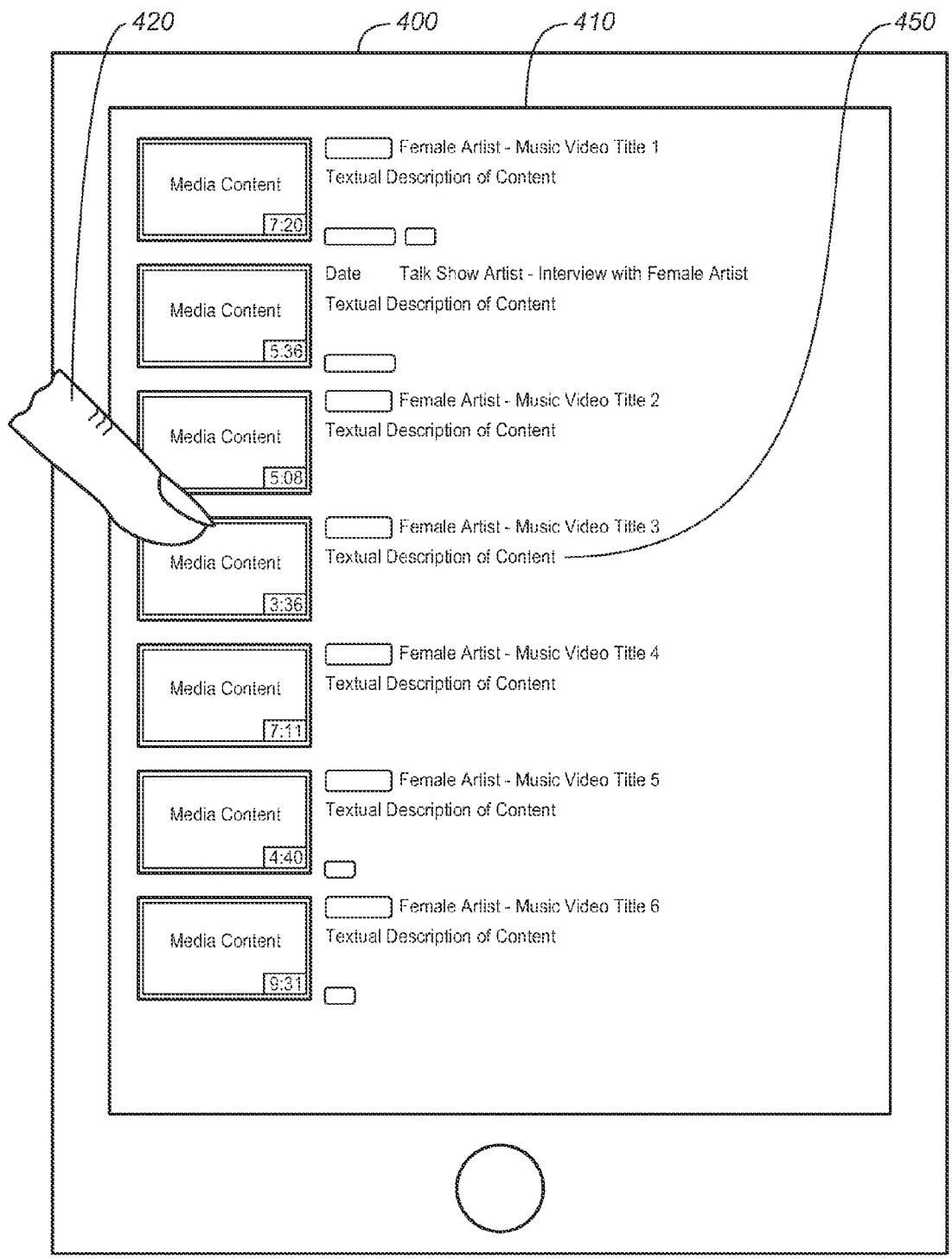
FIGS. 4A-4D show exemplary illustrations of the GUI according to an additional embodiment of the present system.

An interface like the one illustrated in FIG. 4A may allow the user to list different media contents from the media content database 211 available for viewing (if video content) or listening (if music). In the here after description, reference is made to media content streamed on mobile device 200 thanks to the media content server 211. The present teachings could be implemented as well for content held locally on the mobile device 200.

Figure 4B:
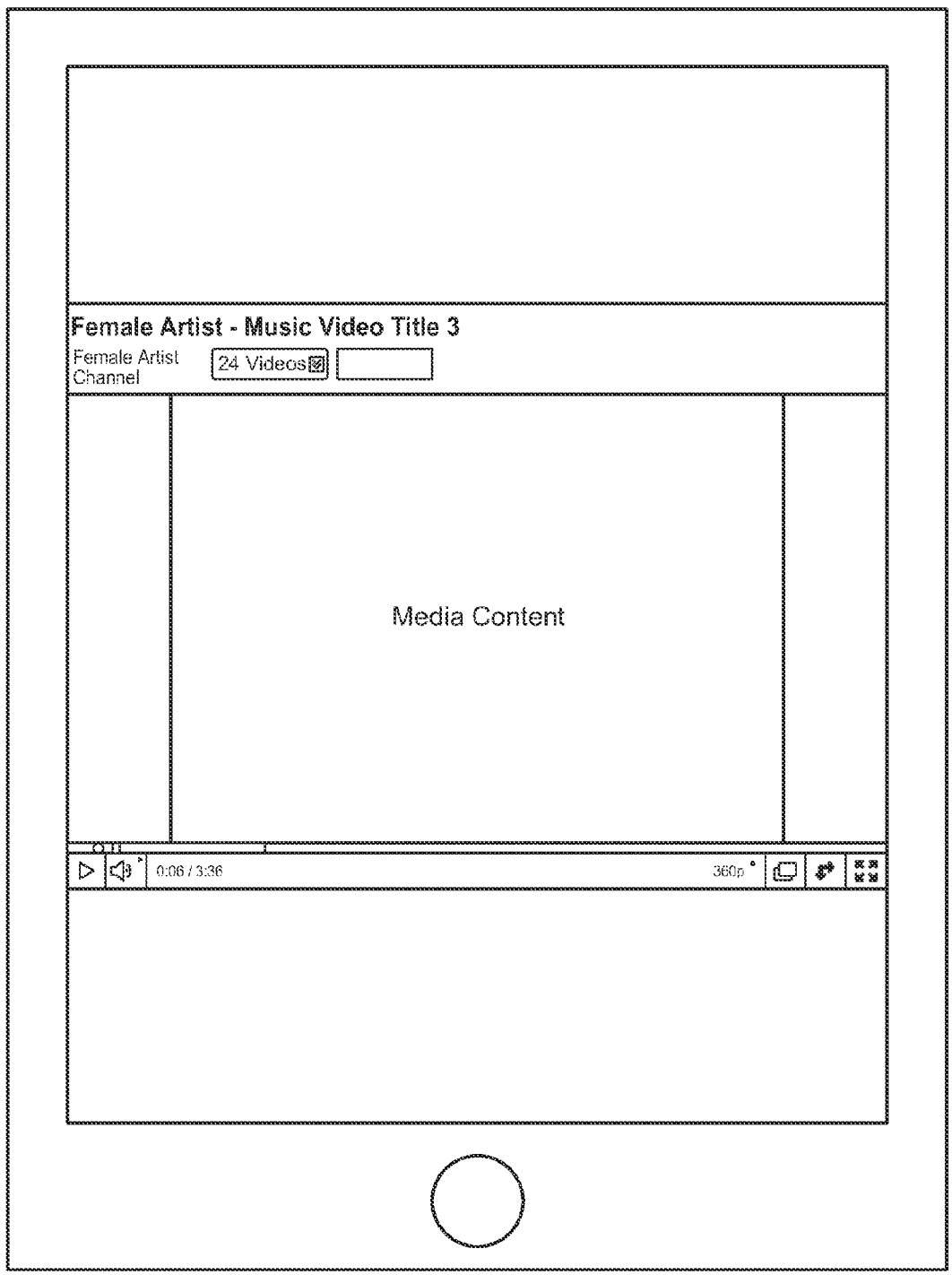

Thanks to the present system, a user may select a media content 450 with his finger 420 as shown in FIG. 4A. The selected content, once played as in FIG. 4B, is available for swooping to another display device, i.e. for further display on that other display device.

Referring back to FIG. 2A, a number of different display devices is available for playing the selected media content 450. In FIG. 2A, three different devices, respectively a computer screen 231, a tablet 232 and a TV screen 233 can be chosen by the user to further display the selected media content 450.

To that effect a queuing server 212, or swoop server, is provided in the present system to instruct the chosen display device to play the selected media content. Once a media content is selected for swooping to another display device, the swoop server 211 will receive from the mobile device 200 an activation message that the selected content is to be played on that display device.

One may note that the display devices are illustrated as hardware. This is in no way limiting as the asset may be swooped to any end point such as a software or player hosted on such electronic devices, or even a user of a social network, identified e.g. through his user name. For instance the media may be swooped to a Roku Player or a browser hosted on a personal computer. They may appear to the user as two different target displays even though hosted by the same electronic device. Additionally, the asset may be swooped to a friend on a social network, the friend's name appearing as a virtual representation on the GUI, provided the friend has accepted to become a swoopee for all assets a user may want to transfer to him.

Figure 2B:
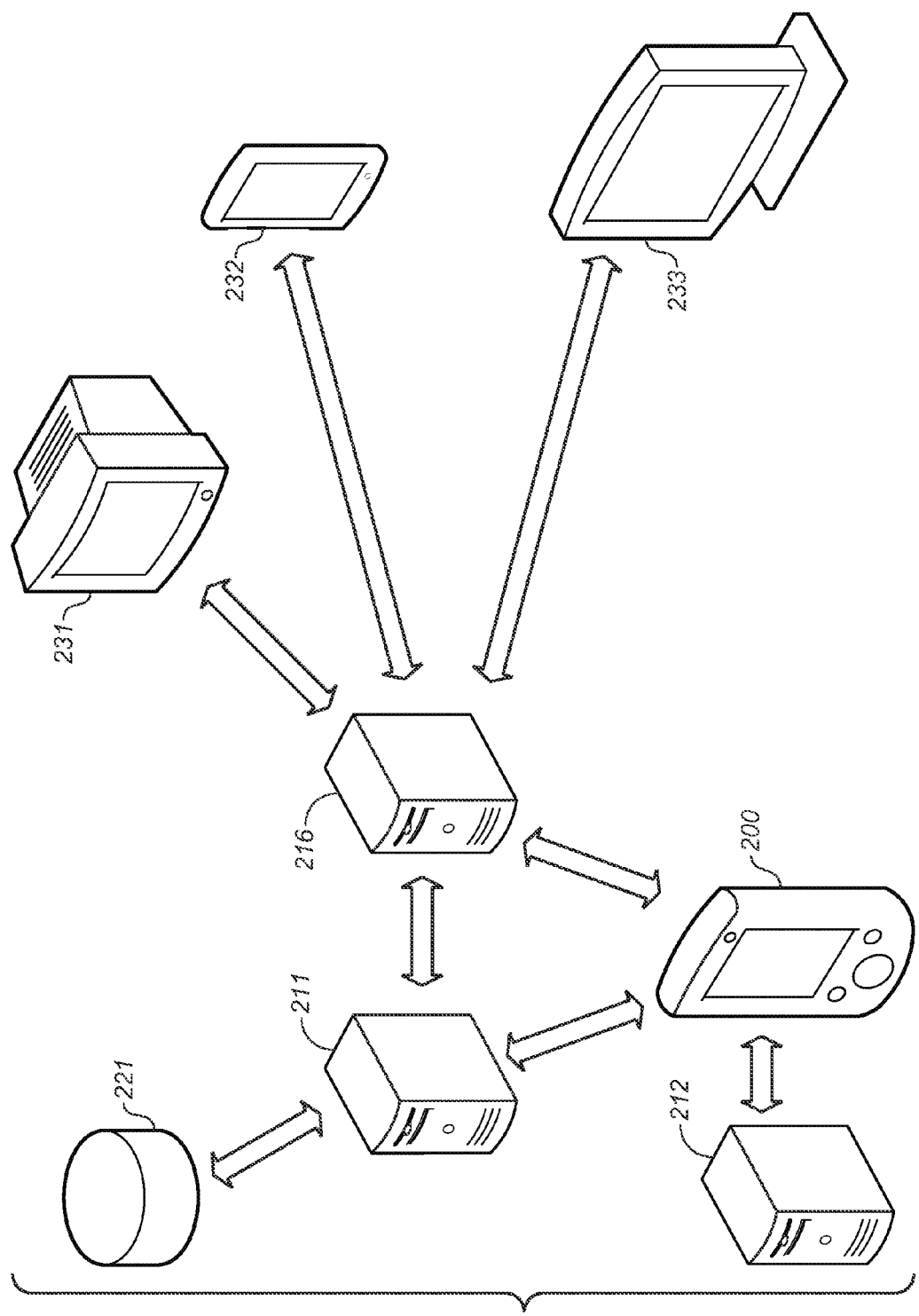
FIG. 2B shows an illustration of a second embodiment of the present system.

FIG. 2B is an illustration of a second embodiment of the present invention. The display devices 231 to 233 are provided, along with mobile device 200 and the media content server 211 and the one or more media content database 221. A home network is further provided through a home server 216. The different devices, including mobile device 200, may communicate with one another through a wireless protocol like a WIFI network enabled thanks to the home server 216. Mobile device 200 may also access the media content libraries 221 through the home server 216, or directly using a 3GPP connection. A swoop server 212 may also be provided for downloading the swoop application if not provided with the mobile device 200.

In the illustrative embodiments of FIGS. 2A and 2B, the mobile device 200 and the different display devices 231 to 233 are operatively coupled indirectly, either through the swoop server 212 or the home server 216.

Figure 2C:
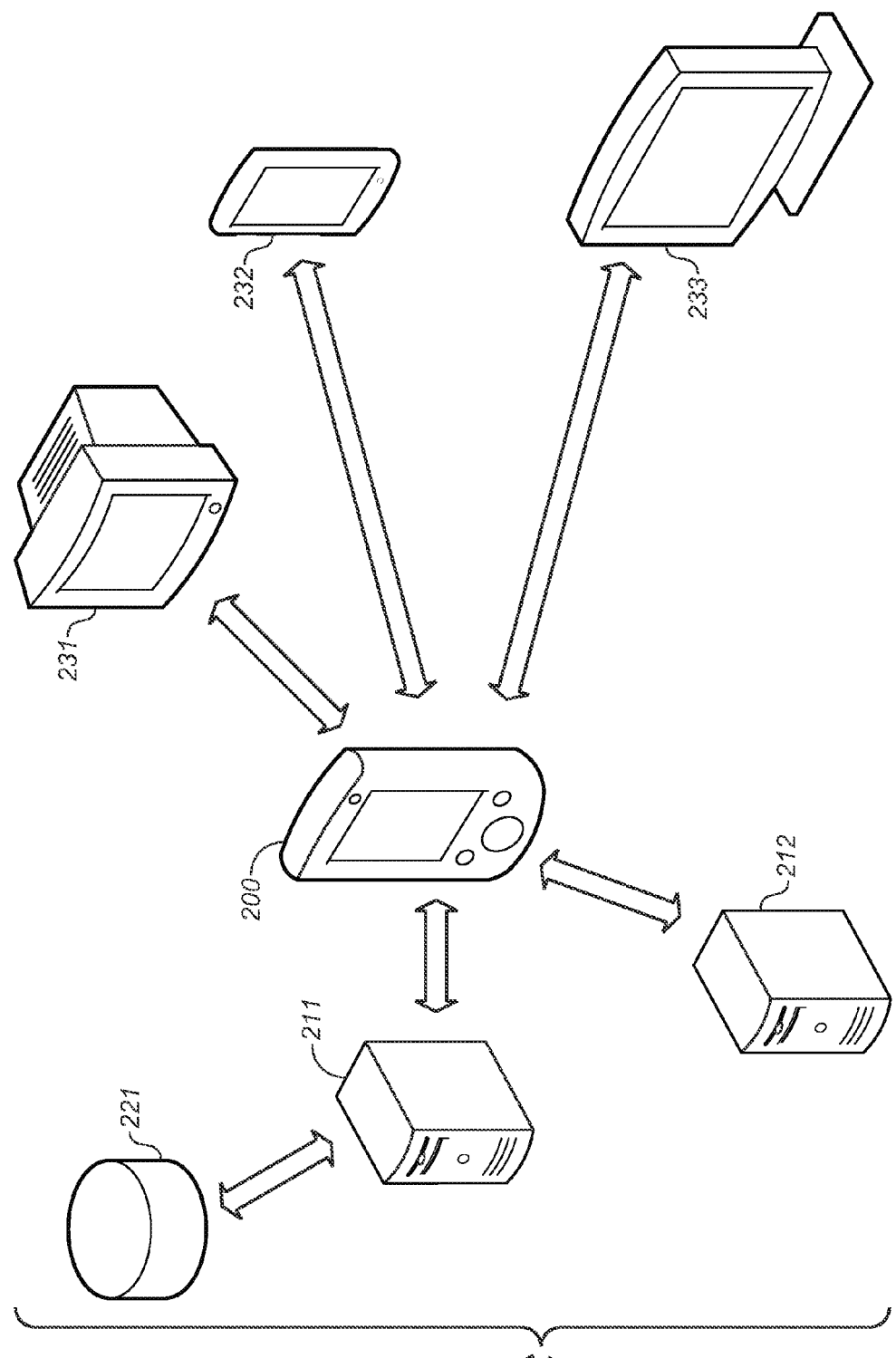
FIG. 2C shows an illustration of a third embodiment of the present system.

FIG. 2C is another illustration of a third embodiment of the present system. In this embodiment, mobile device 200 is paired directly, on a one on one basis, with each display device. A variety of communication bearers may be used for the direct coupling between the mobile device 200 and the display devices 321-323. Such communication bearers may include for instance NFC (near field communication) or Bluetooth. A swoop server 212 may be provided for downloading the swoop application if not provided with the mobile device 200.

Figure 4C:
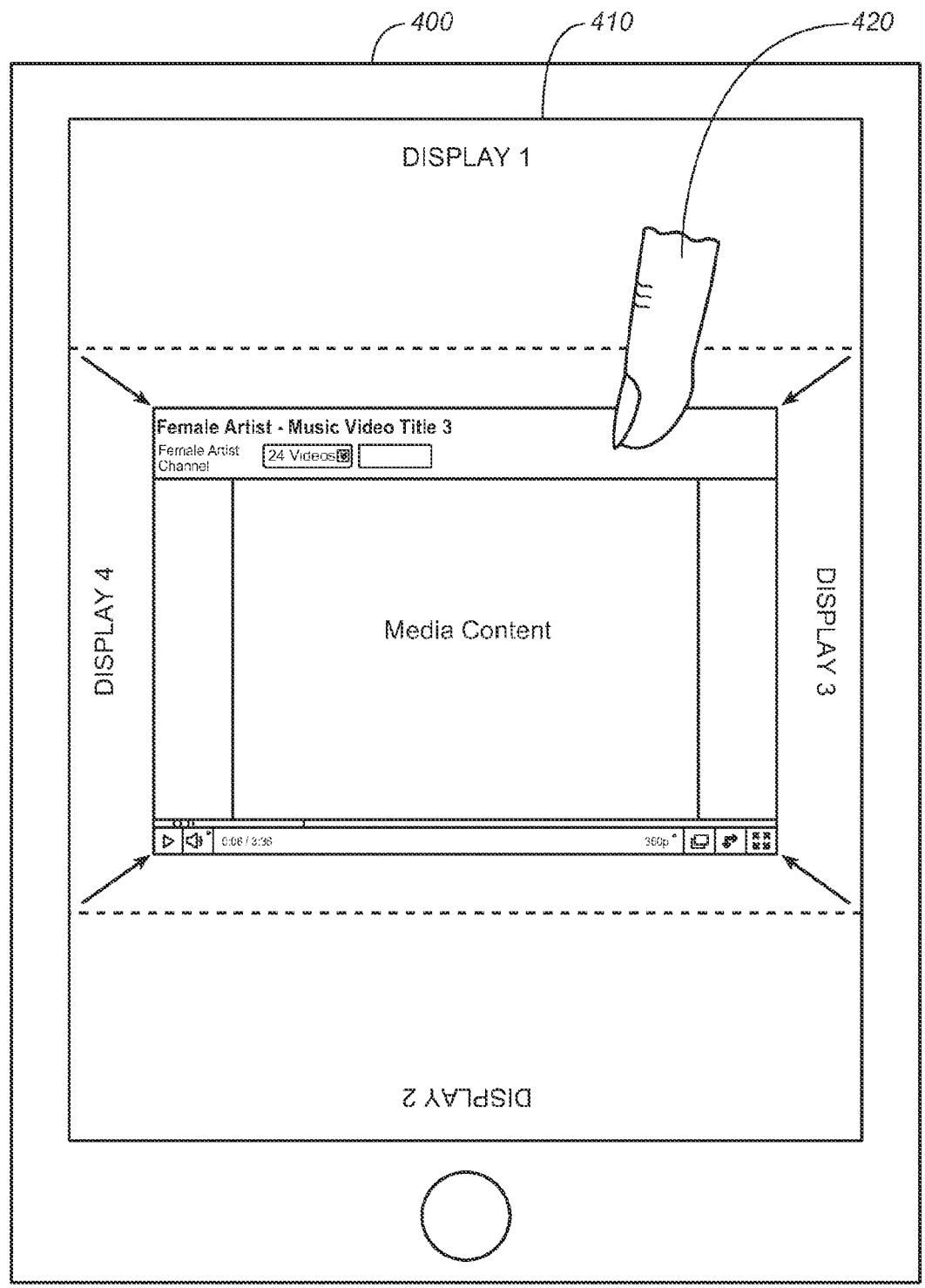
Figure 4D:
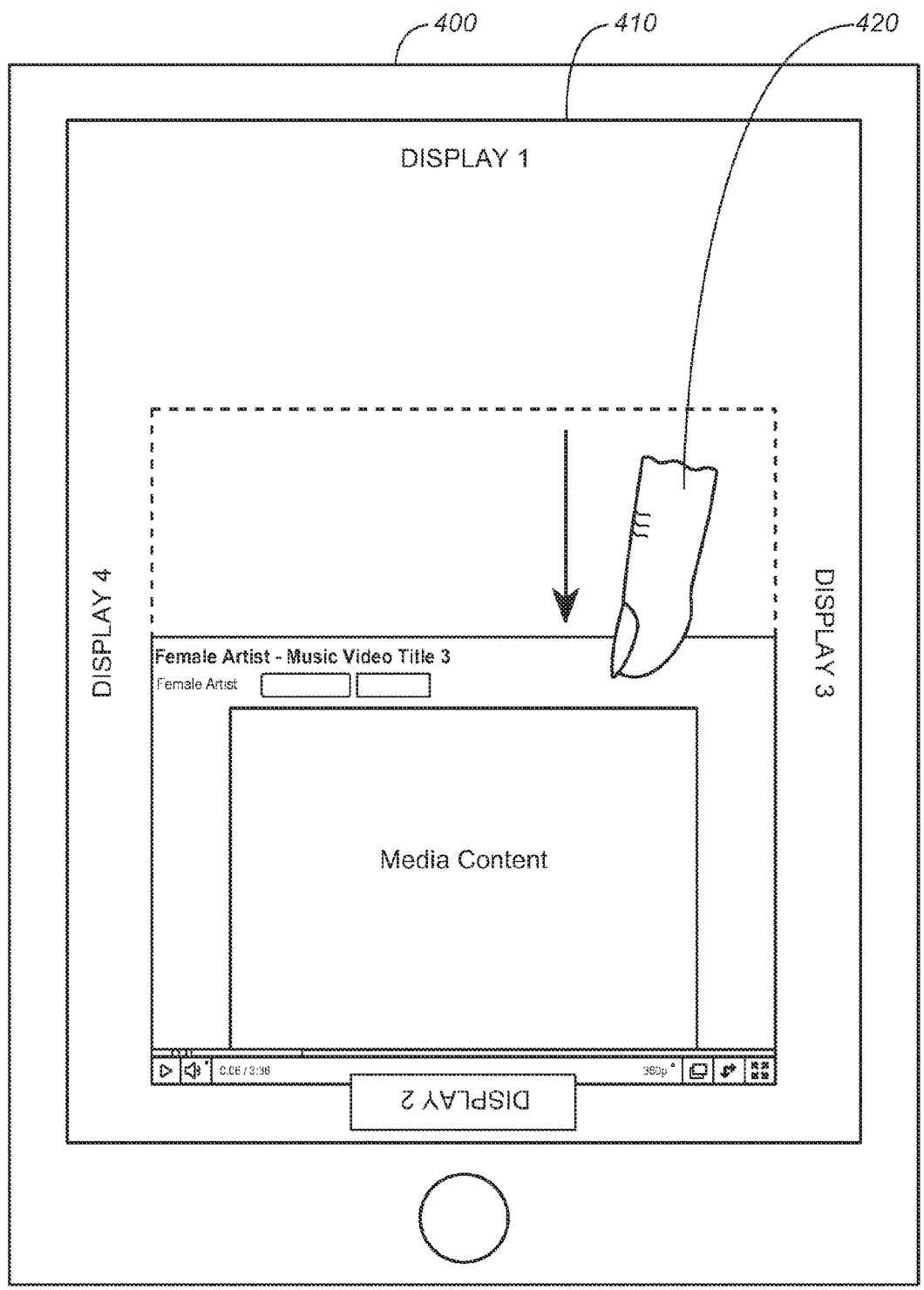
Figure 5A:
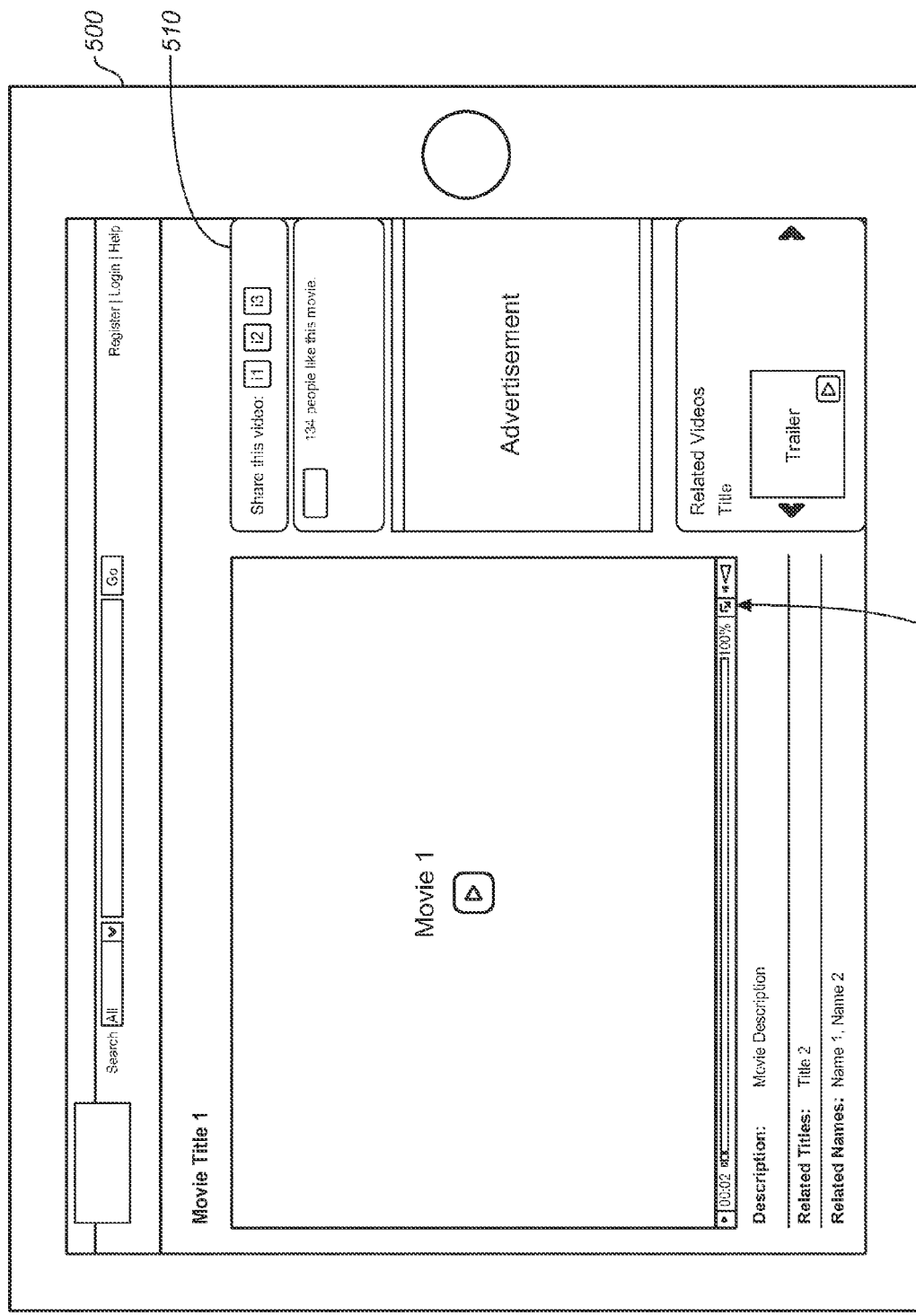
FIGS. 5A-5B show exemplary illustrations of the GUI according to another embodiment of the present system.
Figure 5B:
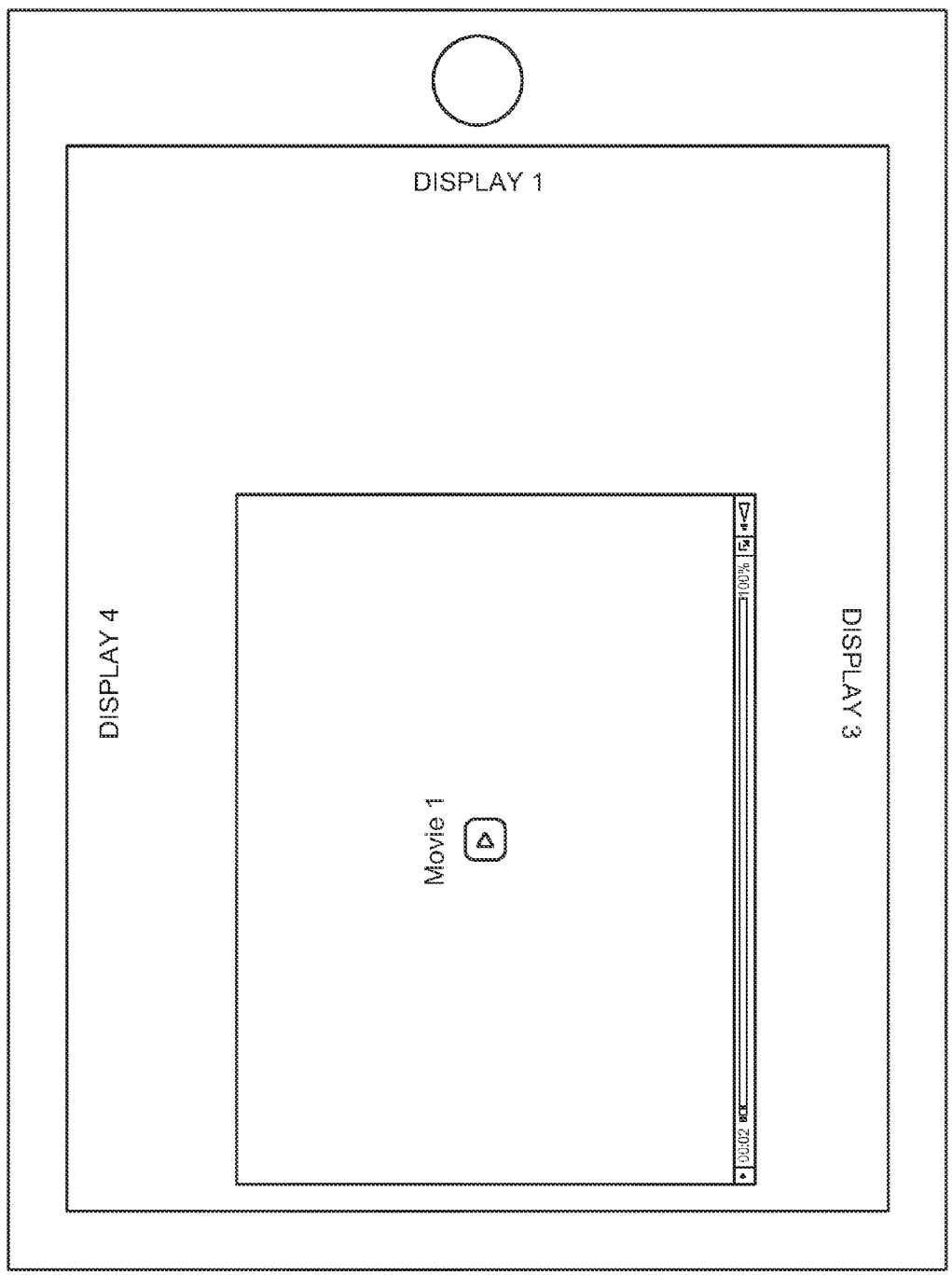
Figure 8B:
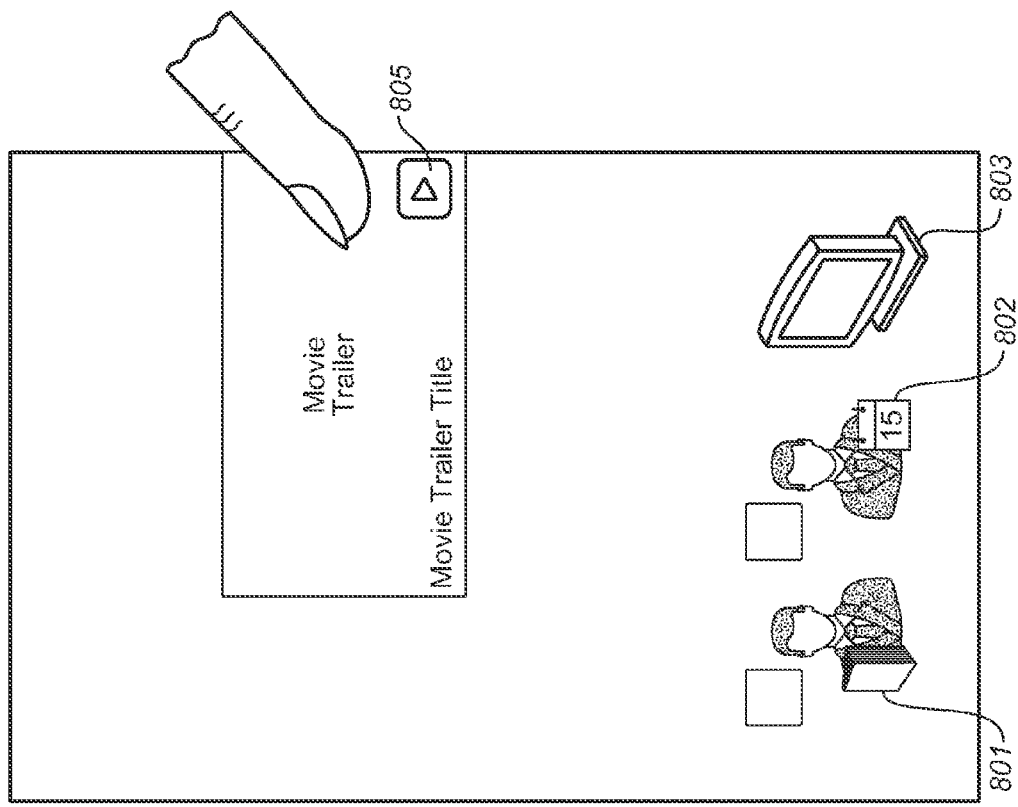
FIGS. 8A-8B show another illustrative embodiment of the free space generation in the present system; and, FIG. 8C show another exemplary flowchart in accordance with an embodiment of the present method.

Any combination of the exemplary embodiments of the present system may also be envisioned depending on how the mobile device 200 communicates—directly or indirectly—with the plurality of display devices. Regardless of the chosen communication path, the swoop application present on the mobile device may be arranged to:

- receive information about, i.e. register, the different display devices so as to allow the user to choose one target display device that will play the selected media content. The swoop application may even receive update status information for a swoopee, the update status information comprising an availability indication, i.e. an active or inactive status, for rendering of any swooped asset,
- connect with the media content server 211 and browse the one or more media content libraries 221 for remote content,
- display a list of media content or assets available for consumption by the user. Consumption will mean experiencing or rendering of the media content as mentioned before,
- enable selection of a media content in the list. The discovery of media content here after is illustrated as a search with a hit list. This is one of many different discovery techniques as the user may simply select a media content as shown in a webpage referring to that media content (see for instance FIG. 5A or 8A),
- receive from the user a first touch input indicative of the initiation or triggering of the transfer to one of the display devices. That first touch input may be for instant a "go to full screen" request as illustrated in FIG. 4B. Other specific touch inputs may be used, like a predefined 2 or 3 finger touch to distinguish that first touch input from known scrolling or zooming touch input. Once that first touch input is captured, the swoop application or user device will enter what is referred to the swoop mode here after,
- play the media content in a window. This may be automatically achieved with the first touch input (for instance with the full screen request). Alternatively, the media content may start playing in its initial window when founds as embedded in a webpage. This is possible for instance today when embedding a Youtube™ video in a webpage, video that appears at first with a frozen image as illustrated in FIG. 5A. That video will start upon simple clicking on or touching the frozen image. In that particular embodiment of the present electronic device, the first touch input may be provided after the start of the media content playing, for instance through a swoop button 502 as seen in FIG. 5A or through a drag input, initiating a drap and drop operation. A drag touch input may be defined as the combined action of holding or pressing on a graphical object like a window, followed by pulling the object to grab and move it away from its initial screen position,
- generate a free space between the played media content and the contours of the display. This free space enables the swoop application to display the virtual representations of the targeted display devices. Virtual representations may be for instance icons or names for the display devices. The virtual representations will be illustrated here after as icons for simplification purposes. The GUI with the media content played in a window, along with the virtual representations, may be seen as a swoop or drop screen, i.e. a second GUI enabling easy transfer of the media asset by the user. When shrinking of the window is involved, like with the illustrative embodiment of FIG. 4, the different display device names or icons can be shown in the free space resulting from the shrinking (see FIG. 4C). Alternatively, the data displayed around the window may be erased or faded out, as seen in FIG. 5B or 8B. The display device icons can then appear in the generated free space,
- capture a continuous touch input (i.e. a drag) provided from the user to move the window in the direction of one of the targeted display device icons. In the present method, the window will be displaced across the interface 140 with each additional touch input of the continuous drag input. For instance, in an additional embodiment of the present method, the displacements of the window may be configured to be of the same amplitude and in the same direction of each additional drag input. This will give the user the impression that he is actually moving the window towards the target display device, as in a know drag and drop operation,
- generate an activation message when the window comes within a given distance of a display device icon. This may corresponds for instance to a drop, at the end of a drag and drop operation when the window is on, i.e. touching the target display device icon. That activation message may be sent to the corresponding display device directly or be handled by the swoop server (if any). It will comprise information like the currently played media and optionally the time in the played media when the given distance was reached or activation message generated. This may be the time in the media duration when the rendering is supposed to resume in the targeted display device. This can give a sense of continuation and fluidity of display to the user.

Other functionalities of the swoop application will be described here after in relation to the other FIGs. The illustration of a swoop application is in no way limiting as the listed functionalities may be provided to an existing media player or a web browser through plugins, instead of a dedicated application. Other embodiments to implement the swoop on an electronic device with a touch panel are readily available to the man skilled in the art.

Figure 3A:
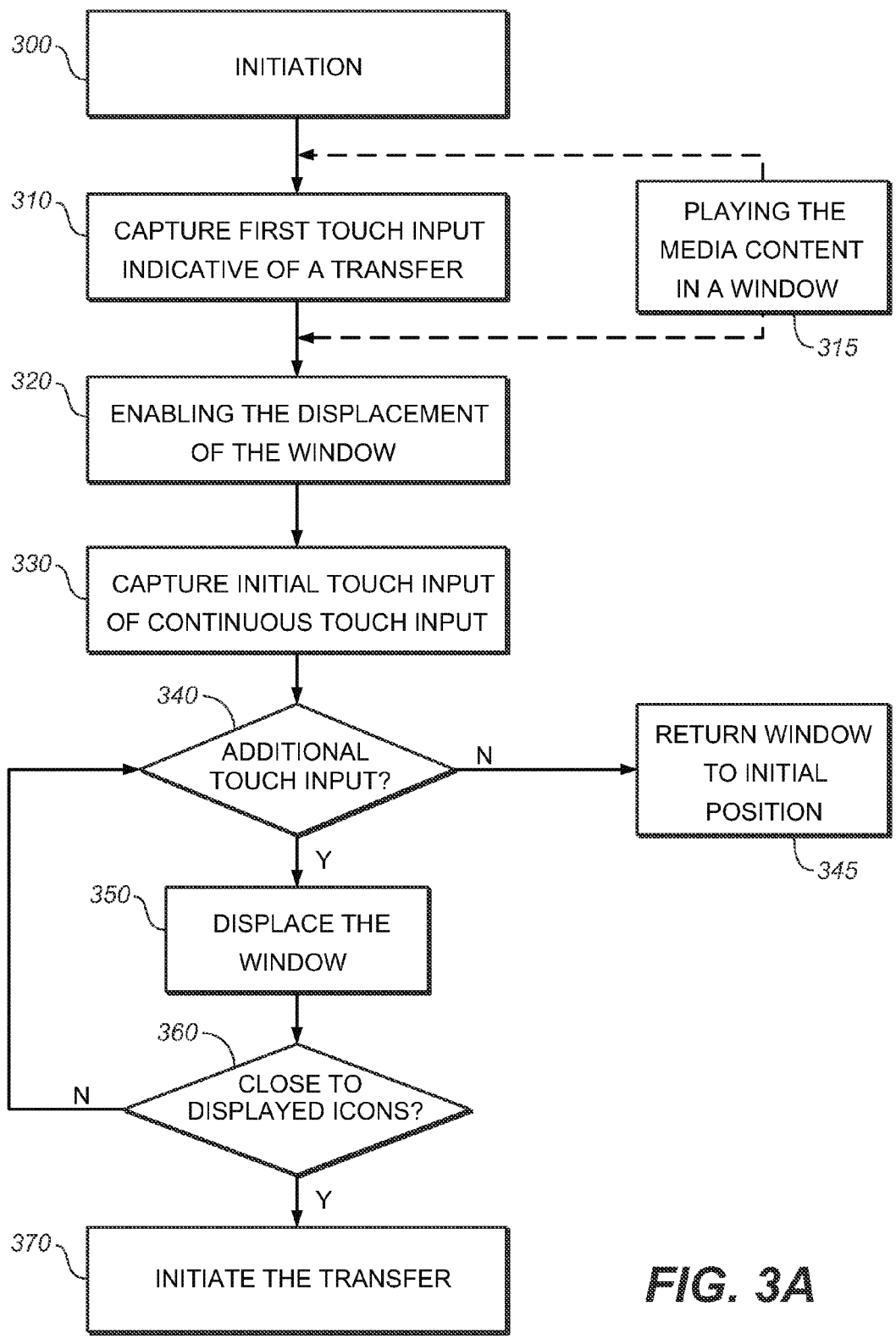
FIG. 3A, shows an exemplary flowchart in accordance with an embodiment of the present system.

FIG. 3A is a flowchart illustrating another embodiment of the present method. Flowchart of FIG. 3A will be described in relation with examples of FIG. 4 describing a swoop based transfer triggered by a full screen mode, and FIG. 5 showing a swoop triggered through a dedicated swoop button.

In an initiation act 300, the user may download the swoop application or a relevant plugin in order to enable his mobile device with the swoop based transfer. The download may be performed from the swoop server 212 of FIG. 2A, 2B or 2C. The initiation act 300 may further comprise the registration of the targeted display devices. The registration allow the association between a swooper device like mobile device 200 and swoopees like targeted display devices 231, 232 and 233 in FIG. 2. Registration or listing of the swoopers may comprise information such as name of the device, rank, status (enabled/disabled), device type (tablet, smartphone, laptop or desktop computer, IP TV, high definition TV . . . ), supported media formats (MPEG, AVI . . . ) and direct/indirect coupling (swoop server, communication bearers such as NFC, Bluetooth, WiFi, AirPlay . . . ) and address if needed.

When the swoop server 212 is used to connect the swooper and swoopee devices (exemplary embodiment of FIG. 2A), each targeted display device may be registered with the swoop server using a unique identifier (or a pointer to it) that is subsequently passed on the swooper device 200, using for instance the swoop application. Registration may be permitted using a user account the display device are associated with. A user may for instance enable the registration of remote devices.

Alternatively, registration may be performed either using the home server 216 (exemplary embodiment of FIG. 2B) or directly using NFC that allows swooper and swoopees to exchange identifiers, display device type, address in the network, supported media formats and other information.

As indicated before the user may browse the content server for media content to play using the swoop application. As illustrated for instance in FIG. 4A, a list of assets to experience is displayed on the interface 410 of a mobile device 400. The mobile device here is illustrated as a tablet with a touch interface 410. The displayed list of media may comprise for each media content some of the references or meta data provided by the content server for each content. As shown in FIG. 4A, the list is a list of video clips for a given artist, with some references for each clip, as returned following a search. Alternatively, as illustrated in FIG. 5A, the user may look at a webpage, with a video embedded therein, using the touch interface 510 of his tablet 500.

The assets can be characterized by a reference or meta data describing the media.

In a further act 310, the user activates the transfer by providing a first touch input indicative of its initiation. This first touch input, captured by the device, is illustrated as the touch input triggering the full screen mode as seen in FIG. 4B. The user may select a video 450 with his finger 420 touching the picture or the title shown for video 450. The swoop application is then configured to switch to full screen display of the selected video 450 as shown in FIG. 4B (full screen illustrated here with the tablet 400 held in the portray direction). The first touch input may also be through the touch of a dedicated button or icon 502 as illustrated in FIG. 5A, or may correspond to the initiation of a drap operation (as part of a drag and drop).

Based on the configuration of the swoop application, the media content may be played (act 315 in FIG. 3A) either before the capture of the first touch input (act 310) by the electronic device or after. Using the exemplary illustration of FIG. 5A, the user may play the video prior to touching the swoop button 502. Alternatively, the video may be played automatically following the activation of the full screen mode.

Whether the selected video is played or not (generally shown with a frozen image prior to being played as shown in FIG. 5A with the play icon illustrated as a triangle in the middle of the image), the video is presented on the touch interface in a window that can subsequently be displaced by the user through the continuous touch input, i.e. a drag input.

Generally speaking, the provision of the first touch input actually puts the mobile device in the swoop mode. As a direct consequence, in an additional act 320, the mobile device, namely its processor, will enable the displacement of the window. Enabling the displacement of the window responsive to the first touch input allows the user to move the window thanks to a continuous drag input.

The present mobile device is arranged to receive and capture a continuous touch input from an initial position in the window. Various technologies and programming techniques are available today to configure the processor to determine if the capture of a touch input corresponds to a succession of contiguous touch inputs. Such techniques, like drag and drops, are beyond the scope of the present document. The continuous touch input, actually a continuous moving touch input, as opposed to a continuous non moving touch input (finger staying continuously on the same location of the interface), will comprise an initial touch input and additional touch inputs. As mentioned before, a drag operation may be seen as (1) press/hold on a window, icon, graphical object . . . and corresponds to the initial touch input of the continuous touch input, (2) pulling or dragging of the object, i.e. the continuous touch input.

In a further act of the present method, an initial touch input of the continuous touch input is captured within the window (act 330). This corresponds to the initiation of a drag operation. Processor 110 of mobile device 200 will check if this initial touch input is received within the window, i.e. within the window's boundaries. Provided it is, the processor will wait for further touch inputs in an additional act 340. If the continuous touch input is discontinued (answer No to act 340 with no more additional touch input) by the user, for instance if he releases his finger from the screen, thereby ending the drag operation, the displacement of the window may be ended, and the window even returned to its initial position.

Provided an additional touch input is captured (answer Yes to act 340), the processor 110 will proceed with displacing the window, e.g. across the interface, with each additional captured touch input. The displacement may be calibrated in various ways. For instance, the window may be moved on the interface to follow the finger. In other words, each further displacement of the finger, as determined by the processor from the additional touch inputs, is translated into the same displacement of the window, as in known drag and drop operations. The user may have the impression that the window is following his finger. Alternatively, the processor may only follow the direction of the continuous touch input, and will displace the window as if it was gathering momentum. This is for instance known from the scrolling of a webpage or a contact list on smartphones like the iPhone™. The user only needs to give a continuous touch input across the screen, and as he lifts his finger away from the screen, the list carries on scrolling, based on some momentum computed from the motion and/or speed of the finger. This embodiment may be interesting for instance when the user is just aiming at the icon for the targeted display device, as if throwing/shooting the window towards the icon and consequently the corresponding display.

As the window is further moved on the interface, the processor may determine the distance between the window (or one point thereof) and one or more virtual representations, or icons, for the targeted display devices. If the window is not within a given or predetermined distance of one icon (answer no to act 360), processor 110 will resume with monitoring additional touch inputs from the continuous touch input in act 340.

When the window is within the given or predetermined distance (answer Yes to act 360) from one virtual representation (as measured through their respective position on the interface), the display device or end point corresponding to that virtual representation is considered as selected and processor 110 will send an activation message informing that the media content is to be transferred to the selected end point for subsequent rendering.

The distance between the window and the icon of the selected display device may be closed in either through:
 displacing the window with the user's finger toward that icon (when the window is following the touch input as the user is providing the continuous drag input), or
 throwing the window towards one icon when the window is moved using the momentum gathered from the continuous touch input.

In an additional embodiment of the present method, the given distance is nill, i.e. the activation message is sent when the dragged window touches the end point icon. Additionally, the activation message may be sent when the window overlaps the end point icon. This corresponds to the drop leg or operation of a complete drag and drop. The drop is the action of dropping a graphical object like a window or an icon onto a target, like the end point icon, by releasing the dragged object. It may be done by releasing the finger from the touch interface or releasing the mouse button if a pointing device is used. When a drop is detected, the processor will check if the dragged window that has just been dropped is within a predetermined distance of (here nil, i.e. touching or overlapping) the target end point. In this alternative embodiment, the constant monitoring of the distance between the window and the end points is optional and it is only triggered upon the release of the dragged object. In other words, the release of the window, i.e. the drop, will trigger the determination if the window is dropped onto a target icon. This is achieved through checking if the distance between the window and the virtual representation is nill as the window is touching or overlapping the target end point.

The activation message may comprise the following information:
 a media identifier, i.e. some information to clearly identify that this media has just been swooped. The media identifier may comprise for instance an address on the media content server, when the media is streamed, or an indication that the media is local when using the mobile device own libraries,
 a selected display device or end point identifier. This may be derived from the registration of the targeted end points as illustrated in the initiation act 300. The selected display device identifier allows to uniquely identify and retrieve the display device to play the transferred media content. The identifier may be for instance an IP address of the display device in the local network. The identifier may also be the user name of a friend on a social network, along with the social network itself,
 the instant in the media running time when the transfer is required. This may be interesting, when, optionally, the user configures the swoop application to start a transferred media on the selected display device at the moment is it swooped to that display,
 optionally, the media type and display device supported media may be provided in the activation message. The media type corresponds to the transferred media type. The selected display device supported media may be derived from the registration act 300. This information may be available at the swoop server 212 when available with exemplary embodiment of FIG. 2A. The information may be used by the swoop server or alternatively by the media server to adapt the content for the selected display device when it cannot play the media content as displayed on the swooping device.

The recipient of the activation message, as well as the act 370 of initiating the transfer, will depend on the embodiment of the present system. When a swoop server is used (exemplary embodiment of FIG. 2A), the swoop server is the recipient of the activation message. As the display devices are also registered with it, the swoop server knows from the activation message which end point is the target of the transfer. Upon receipt of the activation message, using the information therein, the swoop server may either push the streamed media content to the selected display device by redirecting the stream from the mobile device to the display device, or it may place the media content in a queue, that the targeted display device will poll from on a regular basis to know if new media content is pending for display. With a media content local to the mobile device, the swoop server may simply stream the media from that mobile device to the targeted display device.

When a home server is used to enable a local network, as illustrated in FIG. 2B, the activation message is sent to the targeted display device, and will be routed by the home server. The message may comprise an address of the display device in that local network. The home server, upon receipt of the activation message, will pass it on to the selected display device that may start streaming the content using the media content address in the activation message. The streaming may be performed from the media content server or simply from the mobile device itself if the media content is local to the device.

When the different display devices and the mobile device communicate directly, the activation message will be sent over a communication bearer directly to the device. This corresponds to the embodiment of FIG. 2C. The display device will then start streaming the media content using the address in the activation message.

Other ways to enable the redirection using the activation message are known to the man skilled in the art and are beyond the scope of the present invention.

As mentioned before, swoopees may be end points other than just display devices. An end point may be a browser on a specific display device, like a laptop or a tablet, or a friend on a social network. Indeed, the swoop application may be coupled with a social network platform, offering its members the possibility to declare themselves as potential swoopees. They may register different display devices themselves as preferred recipient(s) of the transferred asset. The user of the swooping device will only need to know that a friend is a potential swoopee. This may be enabled for instance using the swoop server during registration of the different end points by the swooping device (act 300 of FIG. 3A). A virtual representation of such a friend end point will appear just like any other display device on the GUI of the present system. This is illustrated for instance in FIG. 8B, with the target icons 801, 802 and 803, target icons 801 and 802 representing friends on a social network while target icon 803 representing a display device.

When swooping to such a friend end point, the activation message will comprise an identifier for the friend. The activation message or part of it will be passed on to the social network platform that will determine based on the friend profile what the preferred final recipient is. Alternatively, the friend may receive a message that an asset is waiting to be swooped to one of his registered display devices. His response to the message may include the selection of the preferred final recipient.

Figure 3B:
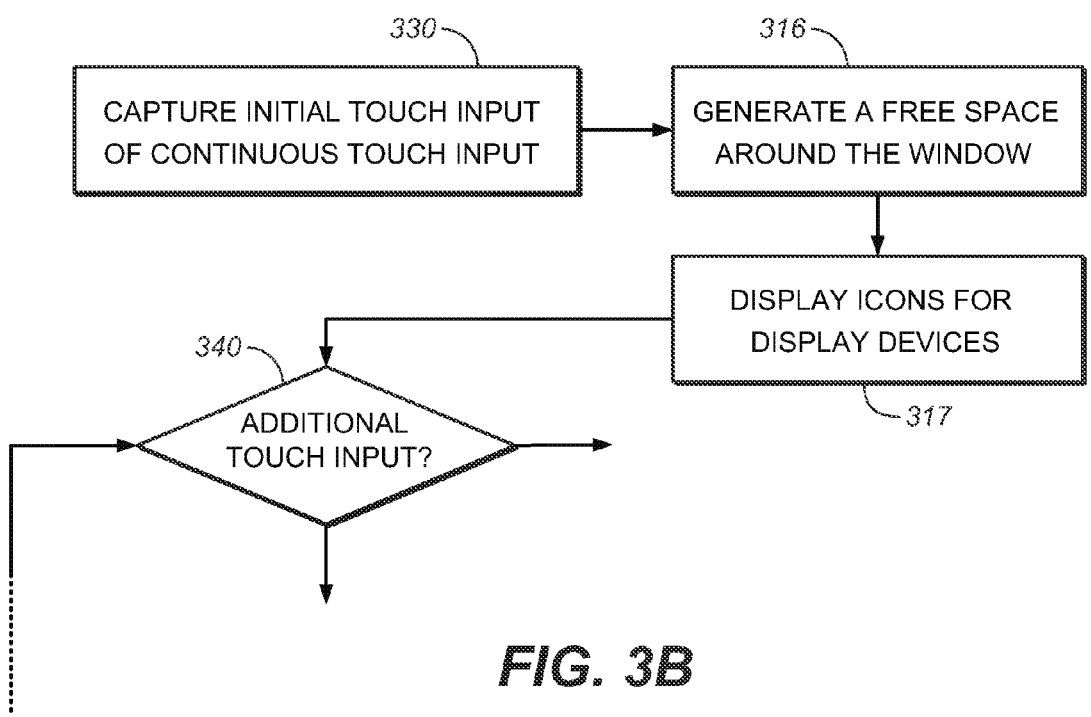
FIGS. 3B-3D show illustrative exemplary embodiments of the free space generation in the present system.
Figure 3C:
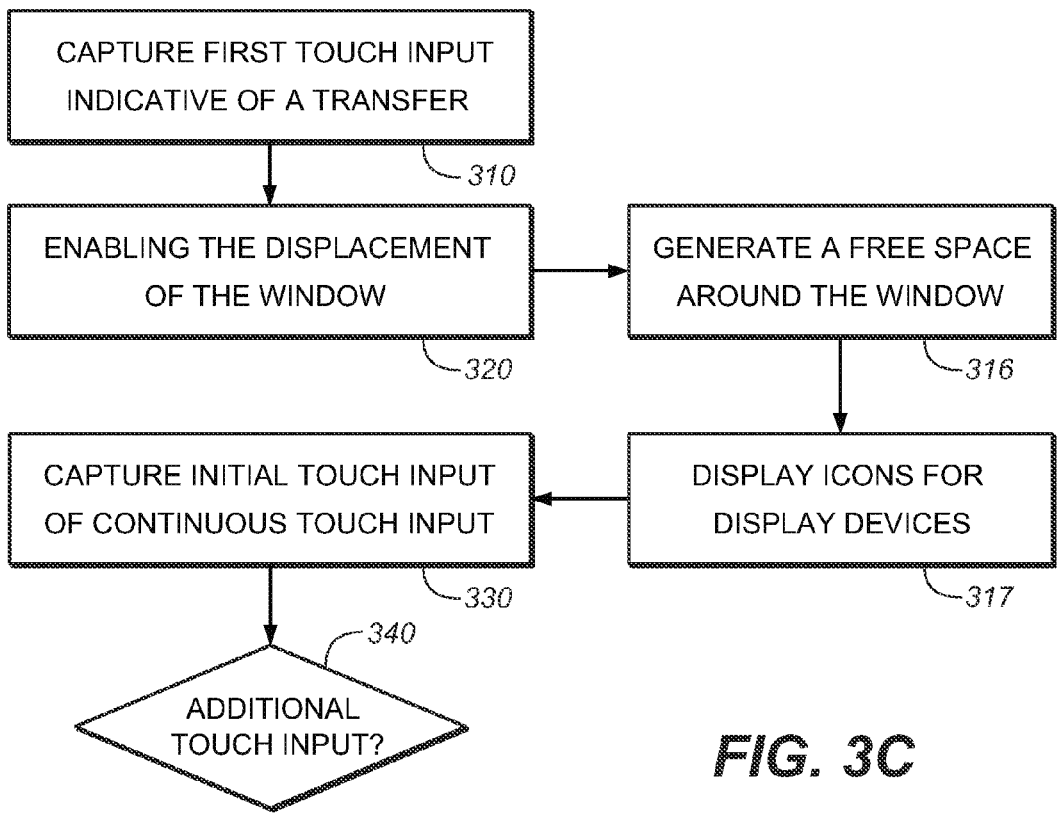
Figure 3D:
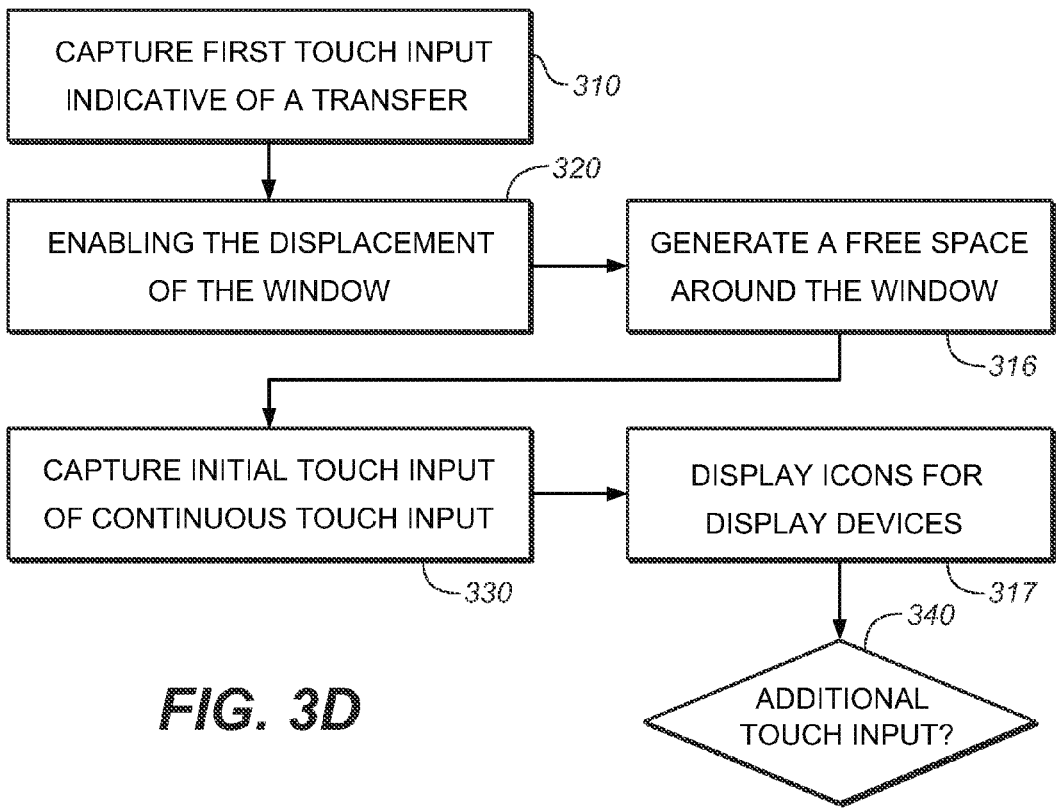

Depending on the size of the window rendering the asset to be swooped, it may be interesting, in an additional embodiment of the present method, to generate a free space around the window, i.e. between the contours of the interface and the window itself. That free space will enable the processor to display the icons for the targeted display devices as well as give enough space to move the window towards one selected icon. FIGS. 3B to 3D are illustrations of different embodiments of the present method to generate this free space.

FIG. 3B shows an exemplary flowchart according to a first embodiment of the free space generation. This is illustrated with FIG. 4C, when after the full screen mode activation of FIG. 4B (resulting from the first touch input of act 310), the swoop application or interface enters the swoop mode. Processor 110 is ready to capture the continuous touch (or drag) input from an initial position in the window. When the user starts the continuous touch input, i.e. after capture of the initial touch input (act 330) within the window, the processor will alter the display by generating the free space in a further act 316. As seen in FIG. 4D, the window's size is shrunk to a size at least smaller than the size of the interface. This facilitates the displacement of the window as additional touch inputs are captured. The widow may be for instance shrunk down to half or a third (as in FIG. 3C) of its size.

Alternatively, as seen in FIG. 5B, the generation of the free space may comprise erasing all displayed data between the contour of the interface and the window. This embodiment is interesting when the full screen mode is not enabled or available, e.g. when the media content is played from a webpage embedding that content.

Another embodiment of the free space generation will be illustrated later on in relation to FIGS. 8A to 8C. Once the free space is generated, in a further act 317, the processor will display the virtual representations of the targeted display devices in the free space. This can be seen for instance in FIG. 4C or FIG. 5B where display device icons named DISPLAY 1 to DISPLAY 4 are positioned by the processor in the interface. Each virtual representation is associated to a display device (known from the registration act 300) and the icon position is known by the processor. That position will enable the processor to calculate the distance between the moving window and the icon as the user continuous drag input brings the window closer to an icon. Processor 110 may optimize the icon positions based on the number of possible display devices and size of the free space so as to allow enough room for a swoop based transfer from the user. The size of the free space from the shrinking embodiment may even be optimized based on the number of registered display devices. In other words the amplitude of the shrinking may be based on the how many display devices are available for swooping.

In an alternative embodiment of the present method, the free space generation may be part of the act 320 of enabling the displacement of the window as seen in flow charts of FIG. 3C and FIG. 3D. In other words, just like the enablement of the window's displacement, the free space will be generated responsive to the first touch input indicative of the transfer. As mentioned before, the first input indicative of the transfer may be the triggering of the full screen mode, the actuation of a dedicated button (icon 502 in FIG. 5A) or the initiation of a drag operation (capturing of a holding/pressing user input within the window).

Following the exemplary embodiment of the free space generation as illustrated in FIG. 3C, responsive to the capture of the first touch input indicative of the transfer (act 310), processor 110 will enable the displacement of the window (act 320) and generate the free space (act 316). The display device icons may further be displayed (act 317) subsequent to the free space generation, i.e. even prior to the start of the continuous touch input (subsequent act 330).

Alternatively, as illustrated in FIG. 3D, once the free space has been generated (act 316), the processor will await the capture of the initial touch of the continuous touch input (start of the drag input, act 330) before showing the display device icons. The present method will carry on with the monitoring of additional touch inputs.

Embodiments of FIGS. 3C and 3D are illustrated in FIGS. 5A and 5B. Once the swoop icon is activated (through a first touch input on icon 502 in FIG. 5A), the free space is generated as the window's displacements are enabled. The free space generation is illustrated there as erasing all data around the window as seen in FIG. 5B. The icons may be displayed either right after generation of the free space or upon capture of the initial touch input of the continuous touch input.

In an additional embodiment of the present method, the display of the icons may be conditional either to the type of media content to be transferred, the availability of the targeted display devices or the type of targeted display devices that were registered. Indeed, prior to displaying the icons, the processor 110 may check the displayed media content format and compare it with the media content formats supported by the registered display devices. The supported formats may be provided, as explained before, during registration (act 300) of the targeted display devices. Provided the formats do not match, the processor may either:
  not display the icons corresponding to the display devices that cannot support the displayed media content format,
  display their icons, but disable the transfer, for instance by disabling the determination that the window is within a given distance of the icons for such devices.

Alternatively, the virtual representations may be an indication of the display device's type, such as laptop, desktop, tablet, smartphone, TV . . . . In an additional embodiment of the present system, the processor 110 may either:
  not display the icons when no display device of a given type corresponding to the icon has been registered. For instance, the type may be "tablet", then the icon "tablet" will not be displayed on the free space if no tablet like an iPad™ has been registered with act 300,
  display their icons, but disable the transfer, for instance by disabling the determination that the window is within a given distance of the icons for such device types.

In an additional embodiment of the present system, the registration act 300 of FIG. 3A may be carried out periodically, or each time a triggering event requires so. This may be the case for instance when the user registers a new display device with the swoop server 212 of FIG. 2A or a new display device is available in the home network enabled by the home server 216 of FIG. 2B. This additional registration may comprise the receiving of status information for the end point, the status information comprising an inactive or active status for rendering of the media content. In other words, availability of an end point may change over time. Another example would be a friend on a social network that the user initially registers as a potential swoopee. The friend may decide to opt out of his swoopee status and disable the swoop feature on his social network account. The update will then be passed on to the swooping device through the social network servers (and the swoop server if available) to the swooping device.

The swoop application may then be configured to display the virtual representation of the end point (corresponding in the present example to the friend) if its updated status is active or available. Alternatively, the transfer to the end point (here the friend) may be disabled as illustrated here before with the end point supported formats.

Once the activation message is sent, the mobile device may stop rendering the transferred asset, while still displaying the icons of the different display devices.

Figure 6A:
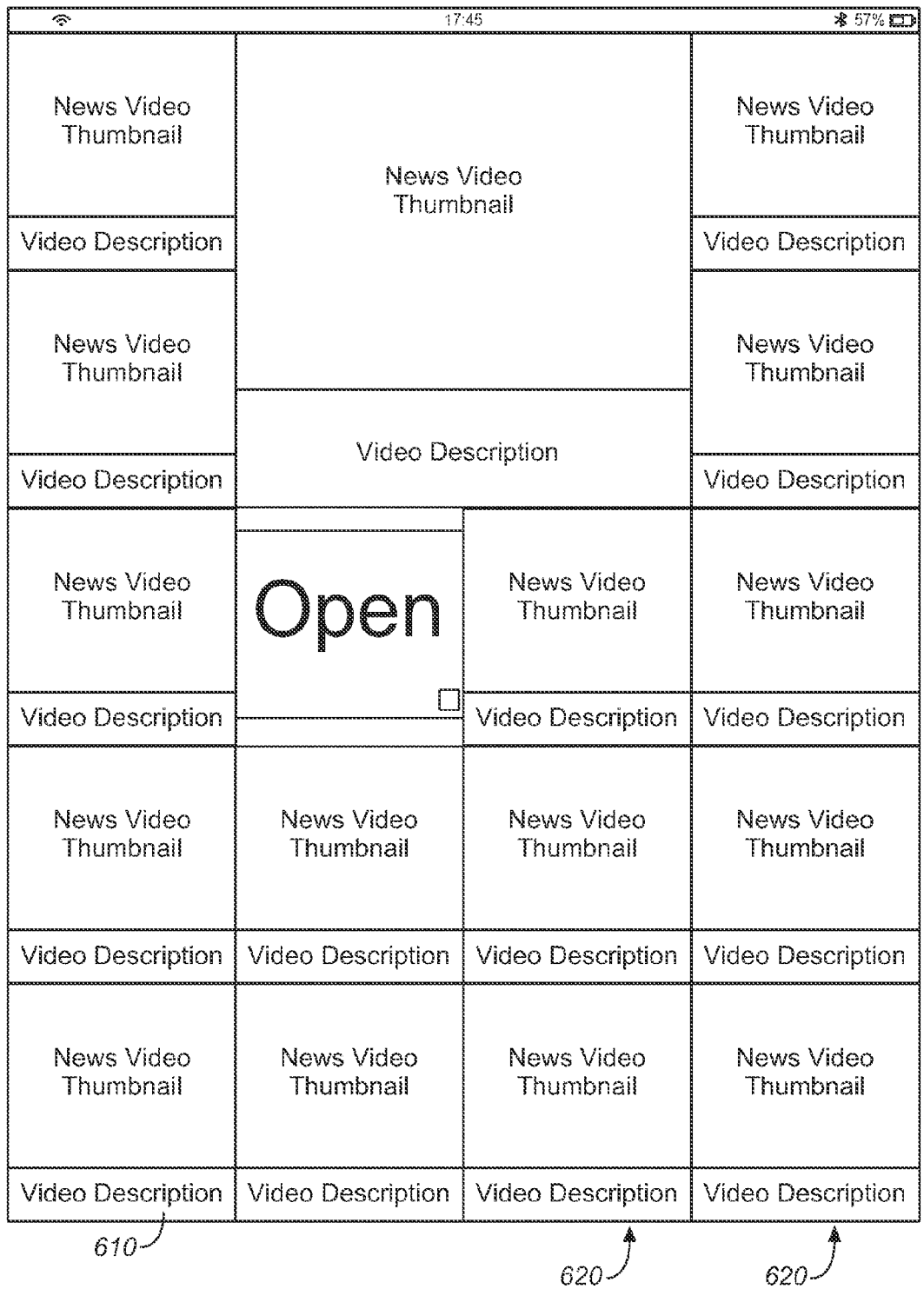
FIGS. 6A-6D show exemplary illustrations of the GUI according to an additional embodiment of the present method shown in FIGS. 7A-7B.
Figure 7A:
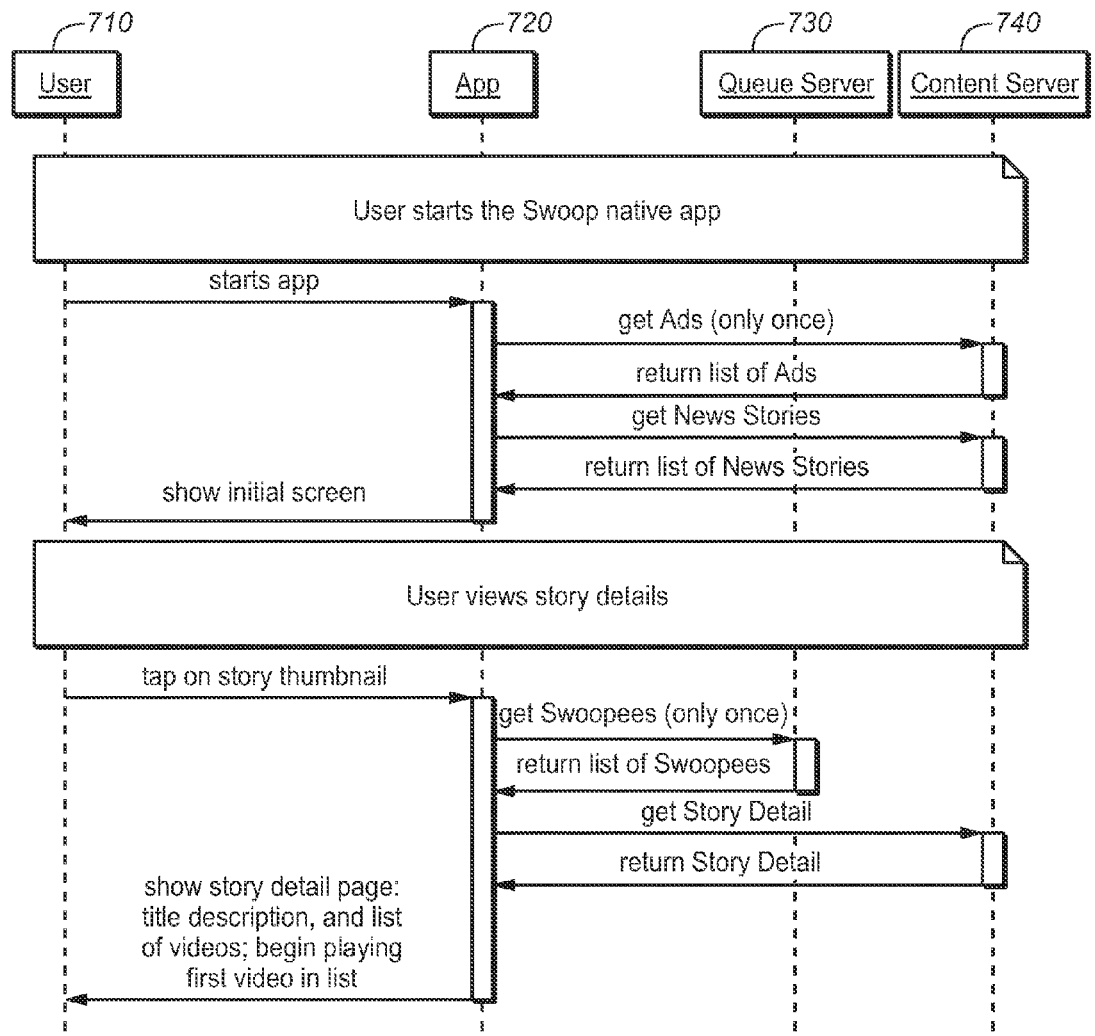
FIGS. 7A-7B show an exemplary flowchart in accordance with an embodiment of the present method.
Figure 7B:
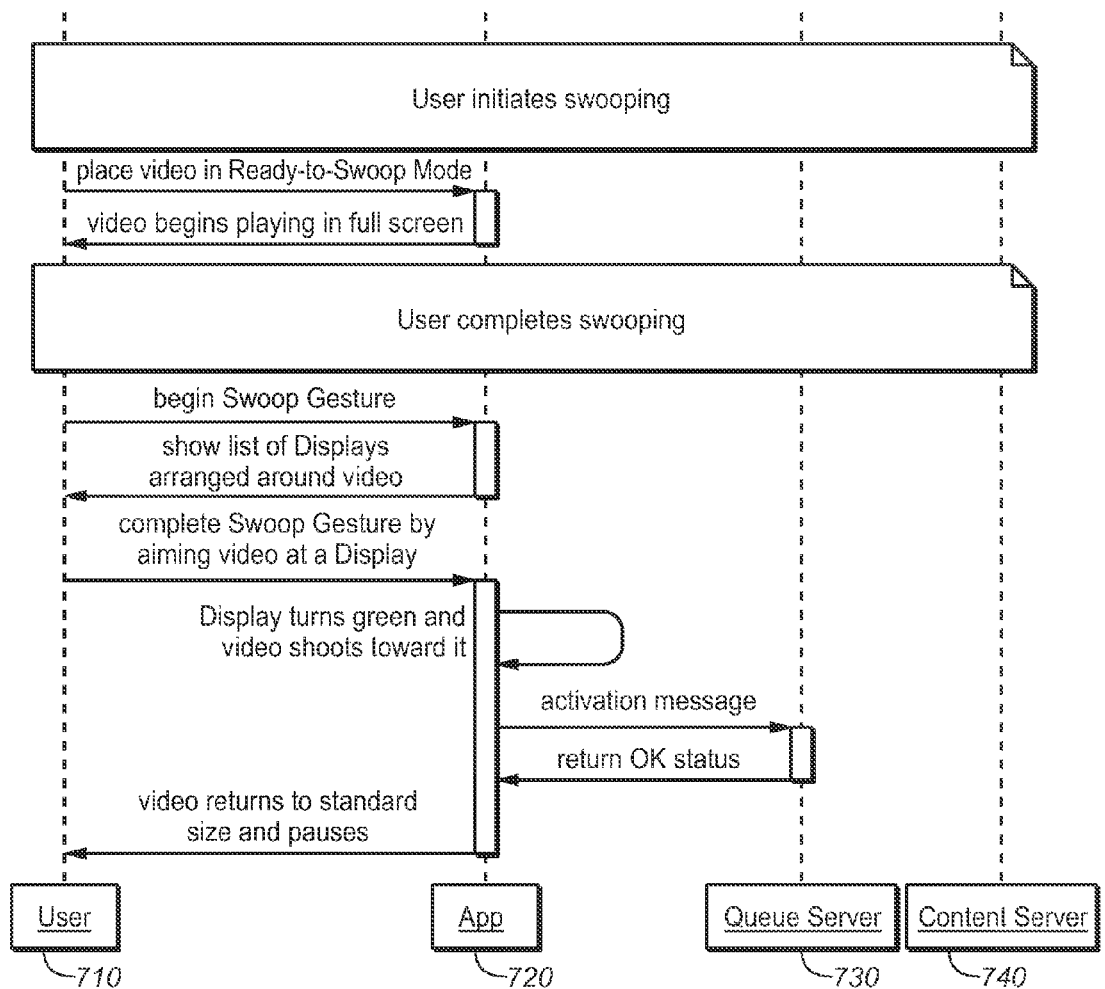

FIGS. 7A and 7B show an exemplary flow chart of messages and actions, according to an additional embodiment of the present system, using a swoop server as in FIG. 2A. A number of swoopees or potential display devices have been registered with the swoop or queue server 730. As mentioned before, registration may be enabled through a user account on that server that lists all display devices eligible for swooping and their respective characteristics (media supported, address . . . ). The user 710 will first start his swoop application 720 running on his tablet. The swoop application may have initially been associated with the user's account on the queuing server 730. Sponsored ads, as received from the content server 740, may be presented to the user through the application. The application 720 can then receive a list of new stories, for instance if the user 710 is looking at the latest news in the world, as published by a world new channel. The list is then presented by the swoop application 720 to the user on interface 610 of a tablet, as illustrated in FIG. 6A, with an exemplary list of news video thumbnails 620.

Figure 6B:
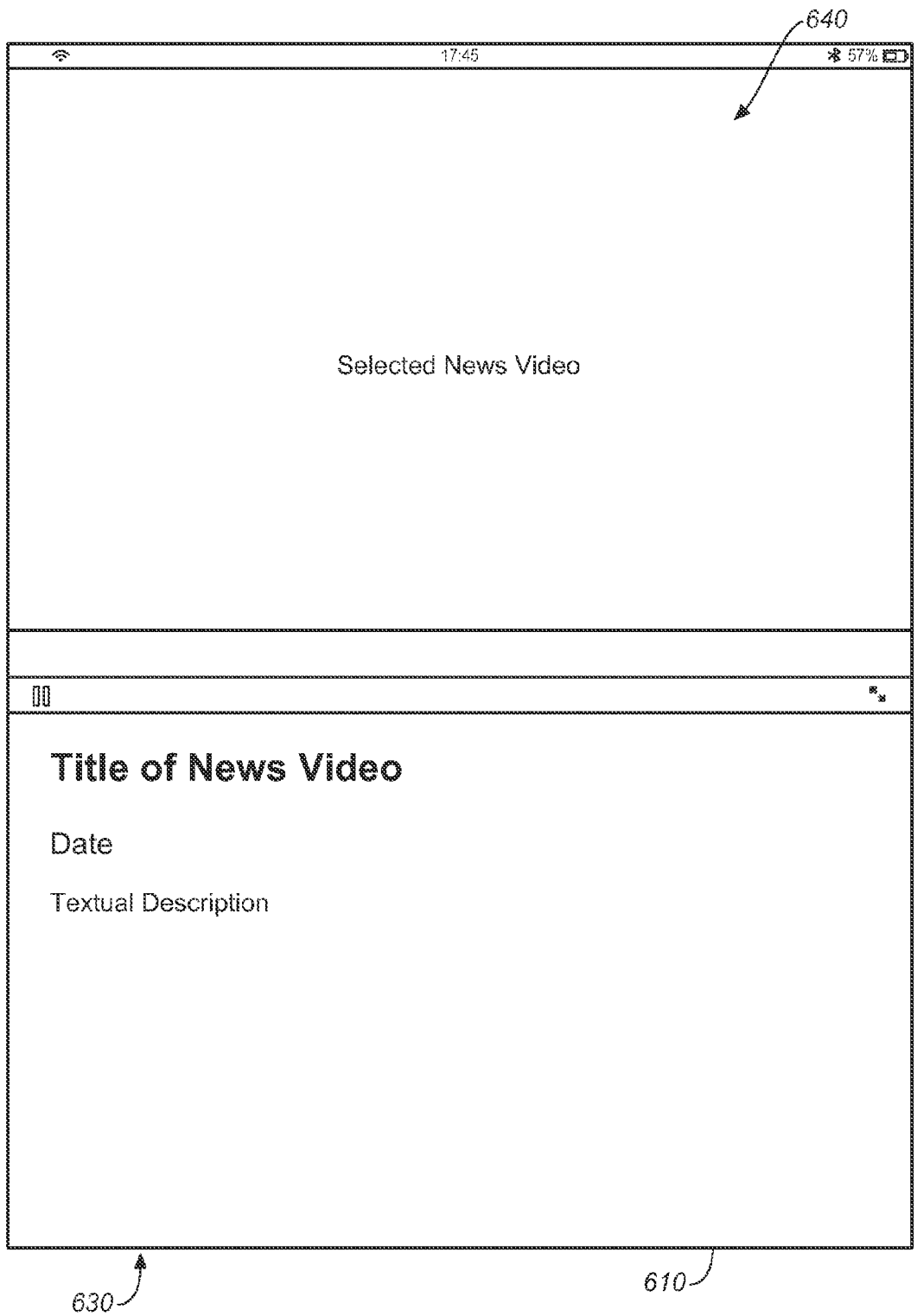

One may note that thanks to the present swoop application 720, all thumbnails are selectable by the user. Once the user has chosen one of the news, he may select an interesting video by touching the corresponding thumbnail to enter full screen mode, thereby providing a first touch input indicative of the swoop based transfer. The swoop application enters the swoop mode and may start playing the video. In an additional embodiment of the present method, the swoop application will query:

the queue server 730 for the list of registered swoopees. This allows the registration of the display devices with the tablet, optionally, the content server, for further metadata or references describing the selected video 630, as shown in FIG. 6B, so that the user can learn more about his selection. The further metadata may be story details for instance.

Once the video is placed in swoop mode, here illustrated in FIG. 6B with video rendered in a full screen window 640 (portray rendering), the user can begin the continuous touch input, i.e. the swoop or drag gesture (of a drag operation). Putting the swoop application in the swoop mode, i.e. a special mode, may be needed to distinguish the swoop gesture from normal touch inputs like scrolling or zooming in or out. In the full screen rendering, the scrolling or zooming are not available to the user, and the processor of the tablet will interpret any subsequent captured continuous touch input (e.g. any subsequent drag input) as part of the swoop gesture. As mentioned before, different first touch inputs may be retained as triggers to the swoop mode.

Figure 6C:
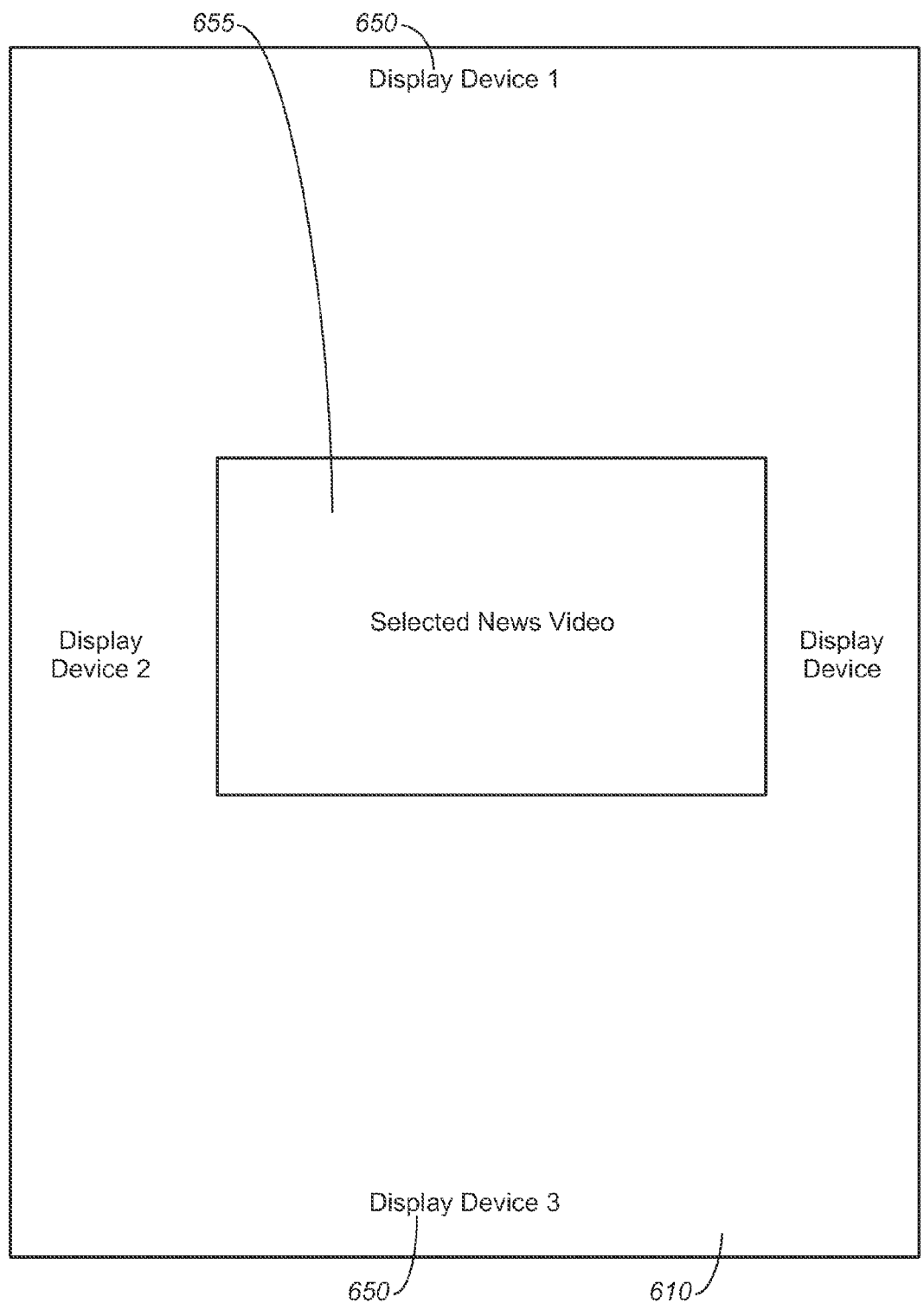

Upon capture of the initial touch input of the swoop gesture, the swoop application will generate the free space (through shrinking as in FIG. 6C) and subsequent display of the icons 650 for the registered display devices, icons arranged in the generated free space around the window 655 rendering the video. The icons are distributed here for instance on the 4 outer edges of the mobile device interface.

Figure 6D:
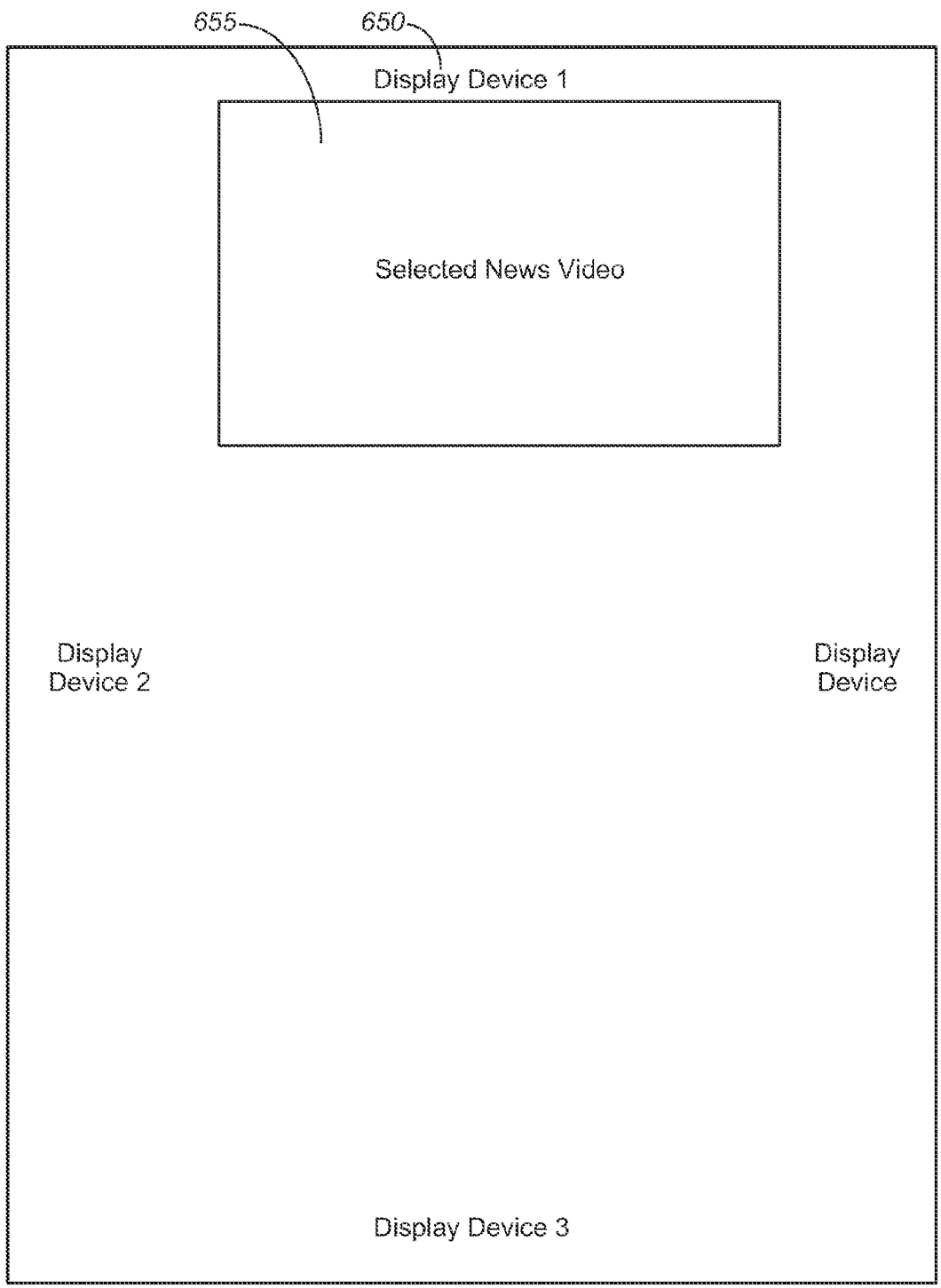

The user 710 can then aim at the icon 650 "PC Browser" as illustrated in FIG. 6D. This is an illustration that the display device may be for instance an application, here a browser, hosted by a specific electronic device like a PC. Different rendering of the transfer, i.e. the sending of the activation message from the tablet, may be used by the swoop application to inform the user that the swoop has been registered by the present system. For instance, a portion of the interface, around the icon "PC Browser" may change color.

In an additional embodiment of the present invention, the swoop application may check if the target display device, here in the example of FIG. 6, the PC Browser, is enabled for swooping. The information may be initially provided during registration of the different display devices with the queuing server 720. Indeed the swoop application may be configured with default or preset display devices, sorted out for instance through their types, like "PC Browser", "iPad", "iPhone", "LG Connected TV" as seen in FIG. 6C. A type may be linked to a known product like the iPhone™, iPad™, or a type of device, like TV, tablet, smartphone, PC browser, or any combination thereof.

An icon will be displayed for each type of display devices. Provided such a display device has been registered, the corresponding icon will become active, i.e. that the processor of the swooping device will determine if that the window is within a given distance of the active icon. In other words, the processor will disable the determination that the window is within a given distance of the active icon when no display device of the corresponding type has been registered. Whenever the user tries to push a window, i.e. a media content, to such a swoopee, no activation message will be generated, and the window may "bounce back" to the middle of the screen. If the swoop application is normally to inform the user of the success of the swoop, that information may be disabled.

Alternatively, the activation of an icon may be conditioned to the media format. Upon registration, information about a display device supported media format may be received by the swooping device, for instance from the swoop server 730. The processor of the swooping device may then determine the format of the selected media.

In an additional embodiment of the present system, the processor of the swooping device may be configured to display the icon of a display device if the determined media content format matches the supported media content formats for that display device. In other words, even if several display devices are registered, only the icons for display devices supporting .AVI formats will be displayed when the selected asset is in that format.

In an alternative embodiment of the present system, the icons for all registered display devices will be displayed.

Nevertheless, only the ones corresponding to display devices handling the asset format will become active.

The activation message may comprise metadata about the media content as well as an identifier and/or address, like a reference or URL, for the targeted display device. In this specific embodiment, the activation message is sent to the queuing server 730. This server can either push the media to the target display device or the PC browser can pull it from a queue list. Once the transfer is successful (the queuing server 730 may return an OK message to the tablet), the video may return to its initial position like in FIG. 6B (full screen mode) or the list of thumbnails may be presented to the user (FIG. 6A).

The activation message may comprise the media content format. This may allow conversion at the queuing server of the swooped asset in a supported format whenever the selected display device cannot handle the swooped asset format.

The present embodiments were illustrated mostly using reference to touch inputs on a touch interface. The presents teaching may easily be implemented using a pointing device like a mouse or a stylus.

Figure 8A:
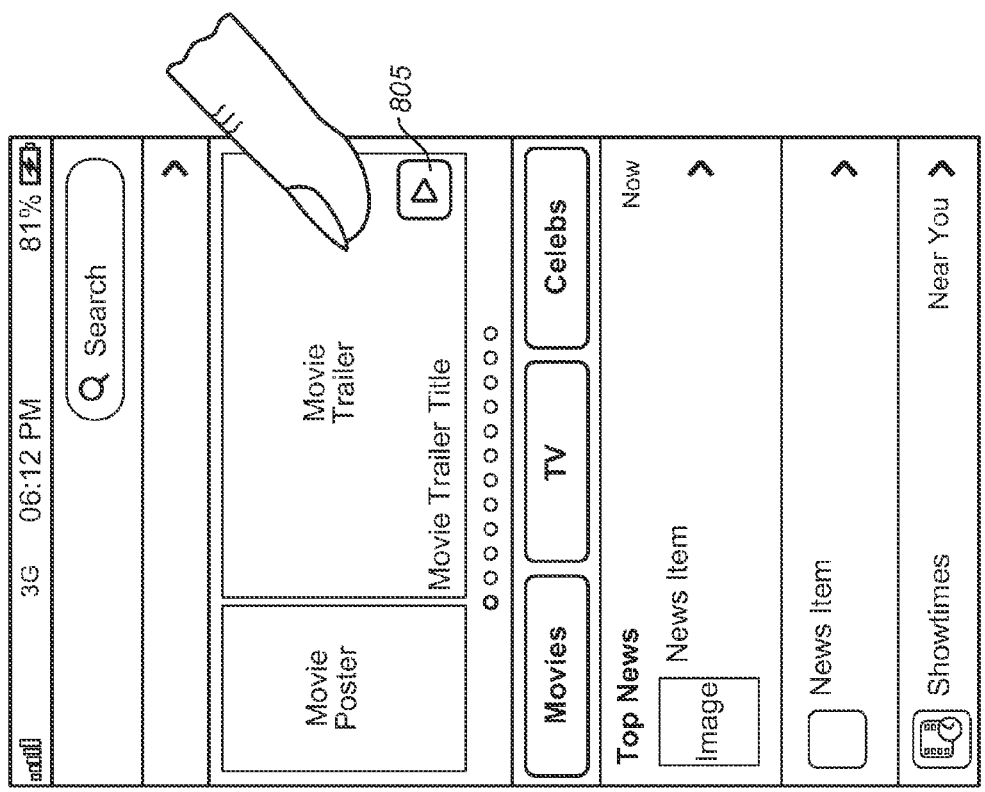
Figure 8C:
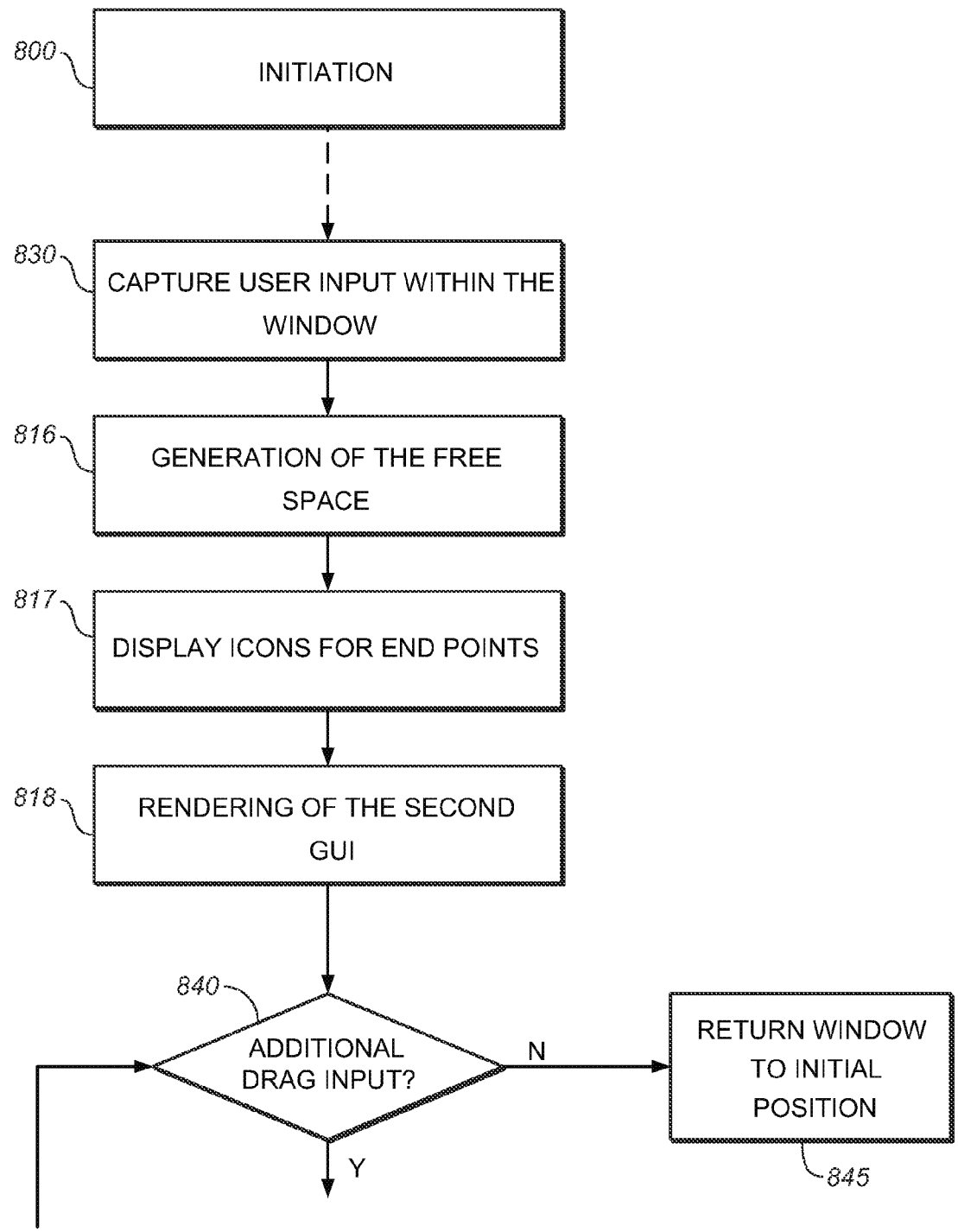

FIGS. 8A-8C are further illustrations of another embodiment of the free space generation. Looking at the flow chart embodiment of FIG. 8C, the initiation act 800 corresponds to the previous initiation acct 300 of FIG. 3A. As described previously as well, the swoop mode will be triggered through the capture of a first user input indicative of the transfer. This first user input may be again one of:
- the activation of the full screen mode,
- the actuation of a swoop button like swoop button 502 in FIG. 5A,
- the initiation of a drag operation on the media presented in the window, through a hold or press input from the user, e.g. a longer user input within the window, like a touch input or a mouse click maintained a certain amount of time, or;
- the capture of a user input of another predetermined type within the window.

With the first two examples of the first user input, the user will carry on with providing a user input within the window showing the asset he wants to transfer (act 830), followed by the continuous or drag input towards one of the target icons. With the two latter examples, the processor will capture and recognize a user input (within the window, act 830) of a predetermined type (e.g. holding or long input, double click or touch, swipe . . . ) that triggers the swoop mode.

In a further act 840 of the present method, once a user input has been captured within the window (act 830), the processor of the mobile device will generate a free space between the contours of the GUI and the window.

A exemplary GUI is shown in FIG. 8A. It shows the capture of a web application showing a frozen image of a video in a window 805. In order to transfer the video corresponding to the window 805, the user provides a selection (here with his finger) within the window 805. The capture of the user input within the window 805 (act 830) will trigger the free space generation of act 840.

To do so, the graphical object, or window, showing the video (or a frozen image of it) in the first GUI of FIG. 8A, is tagged as a candidate asset for a swoop based transfer by the swoop application. This may be performed either before or after the rendering of the first GUI. An event listener will then monitor any user input provided on the interface. When a user input is captured within the tagged object, like the predetermined user input, the free space generation may be triggered.

In an additional embodiment of the present method, the free space is generated in a second GUI, as seen in FIG. 8B, the second GUI will comprise:
- the window in the same position on as in the first GUI of FIG. 8A. If the generation of the free space corresponds to the shrinking of the window, a smaller window with the displayed asset will be positioned within the initial window in the first GUI,
- a free space between the countours of the second GUI and the window, as seen in FIG. 8B, where all the comments, texts, and other graphical elements from the first GUI are not reused.

The second GUI may be referred to as the swoop or drop GUI (if a drag and drop operation is enabled). The icons 801, 802 and 803 for the target end points may optionally be added at this point (act 817) in the second GUI within the free space around the window. Alternatively, they may be displayed after the rendering of the second GUI, to emphasize the transition effect from the first GUI of FIG. 8A to the swoop or drop GUI of the FIG. 8B.

In an additional act 818, the second GUI is rendered on the user device. Transition effects between the first and second GUIs may be used to emphasize the generation of the free space to the user's perception.

Once the free space has been generated, the method can resume with the dragging on the window within the second GUI. Thanks to the present free space generation, the user will be given the impression that all the elements surrounding the selected window disappear and are replaced with only the icons for the candidate end points for a transfer of the asset.

Finally, the above discussion is intended to be merely illustrative of the present system and should not be construed as limiting the appended claims to any particular embodiment or group of embodiments. Thus, while the present system has been described with reference to exemplary embodiments, including user interfaces, it should also be appreciated that numerous modifications and alternative embodiments may be devised by those having ordinary skill in the art without departing from the broader and intended spirit and scope of the present system as set forth in the claims that follow.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for sharing a media content displayed in a window of a first graphical user interface (GUI) of an electronic device with at least one end point, the first GUI comprising the window and data displayed around the window, said electronic device comprising a processor controlling said first GUI, the method being carried out by said processor and comprising:

capturing a user input within the window, the user input being of a drag type input, generating a second GUI comprising:
the window in the same position as in the first GUI, and
a free space between contours of the second GUI and the window, the free space being obtained by erasing the data displayed around the window in the first GUI, rendering the second GUI in place of the first GUI, displaying a virtual representation of the end point in the free space, capturing further drag inputs on the window, displacing the window with each additional captured drag input, and sending an activation message that the media content is to be transferred to the end point for subsequent rendering when determining that the window is within a given distance of the virtual representation of the end point in the free space.

2. A method according to claim 1, wherein generating the second GUI comprises creating at least part of the free space by shrinking the window to a size at least smaller than the size of the first GUI.

3. A method according the claim 1, wherein creating the free space is conditioned upon a determination that the received user input is of the drag type.

4. A method according to claim 1, wherein the media content is stored on the first electronic device, the sending of the activation message comprising pushing the media content to the end point over a communication network.

5. A method according to claim 1, wherein the media content is streamed from a media content server, the activation message comprising redirecting the streaming to the end point.

6. A method according to claim 1, wherein the given distance is nil, sending of the activation message is triggered by capturing a drop of the window on the virtual representation.

7. A method according to claim 1, further comprising:
receiving status information for the end point, the status information comprising an inactive or active status for rendering of the media content, and
displaying the virtual representation of the end point if its status is active.

8. A electronic device for sharing a media content displayed in a window of a first graphical user interface (GUI) of said electronic device with at least one end point, the GUI comprising the window and data displayed around the window, said electronic device comprising:

a processor controlling said graphical input interface, said processor being configured to:

capture a user input within the window, the user input being a drag type input, generate a second GUI comprising:
the window in the same position as in the first GUI, and
a free space between contours of the second GUI and the window, the free space being obtained by erasing the data displayed around the window in the first GUI, render the second GUI in place of the first GUI, display a virtual representation of the end point in the free space, capture further drag inputs on the window, displace the window with each additional captured drag input, and send an activation message that the media content is to be transferred to the end point for subsequent rendering when determining that the window is within a given distance of the virtual representation of the end point in the free space.

9. A non-transitory computer readable medium comprising an application stored thereon and configured to share a media content displayed in a window of a first graphical user interface (GUI) of an electronic device with at least one end point, the first GUI comprising the window and data displayed around the window, the application being carried out by a processor of the electronic device and controlling the graphical user interface, the application comprising instructions configured to:

capture a user input within the window, the user input being of a drag type, generate a second GUI comprising:
the window in the same position as in the first GUI, and
a free space between contours of the second GUI and the window, the free space being obtained by erasing the data displayed around the window in the first GUI, render the second GUI in place of the first GUI, display a virtual representation of the end point in the free space, capture further drag inputs on the window, displace the window with each additional captured drag input, and send an activation message that the media content is to be transferred to the end point for subsequent rendering when determining that the window is within a given distance of the virtual representation of the end point in the free space.

* * * * *

UNITED STATES PATENT AND TRADEMARK OFFICE
CERTIFICATE OF CORRECTION

PATENT NO. : 9,632,688 B2  
APPLICATION NO. : 13/434384  
DATED : April 25, 2017  
INVENTOR(S) : Hyacinthe Briand et al.

Page 1 of 1

It is certified that error appears in the above-identified patent and that said Letters Patent is hereby corrected as shown below:

In the Claims

In Claim 3:
Column 19, Line 39, delete "according the" and insert --according to--

In Claim 8:
Column 20, Line 3, delete "A electronic device" and insert --An electronic device--

Signed and Sealed this
Third Day of October, 2017

Joseph Matal
*Performing the Functions and Duties of the*
*Under Secretary of Commerce for Intellectual Property and*
*Director of the United States Patent and Trademark Office*